United States Patent
Otake et al.

(10) Patent No.: US 9,470,922 B2
(45) Date of Patent: Oct. 18, 2016

(54) DISPLAY DEVICE, DISPLAY CONTROL METHOD AND DISPLAY CONTROL PROGRAM, AND INPUT DEVICE, INPUT ASSISTANCE METHOD AND PROGRAM

(75) Inventors: Naoto Otake, Aichi (JP); Shumpei Zouda, Kanagawa (JP); Noboru Obana, Osaka (JP); Tatsuro Igarashi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 85 days.

(21) Appl. No.: 14/110,573

(22) PCT Filed: May 16, 2012

(86) PCT No.: PCT/JP2012/003210
§ 371 (c)(1),
(2), (4) Date: Oct. 8, 2013

(87) PCT Pub. No.: WO2012/157272
PCT Pub. Date: Nov. 22, 2012

(65) Prior Publication Data
US 2014/0028557 A1  Jan. 30, 2014

(30) Foreign Application Priority Data
May 16, 2011 (JP) .................. 2011-109344

(51) Int. Cl.
*G02F 1/1333* (2006.01)
*G06F 3/0354* (2013.01)
(Continued)

(52) U.S. Cl.
CPC ....... *G02F 1/13338* (2013.01); *G06F 3/03547* (2013.01); *G06F 3/044* (2013.01); *G06F 3/0488* (2013.01); *G06F 3/04817* (2013.01); *G06F 2203/04101* (2013.01)

(58) Field of Classification Search
CPC ............. G06F 3/0488; G06F 3/04883; G06F 2203/04101; G06F 3/0416; G06F 3/017; G06F 3/04886; G06F 2203/04808; G06F 3/041; G06F 3/044; G06F 2203/04108
USPC ........ 345/156, 157, 158, 173, 174; 715/863; 178/18.01, 18.06
See application file for complete search history.

(56) References Cited

U.S. PATENT DOCUMENTS

| 5,621,438 A | 4/1997 | Kamimura et al. |
| 2006/0161846 A1 | 7/2006 | Van Leeuwen |

(Continued)

FOREIGN PATENT DOCUMENTS

| JP | 06-131120 | 5/1994 |
| JP | 06-301486 | 10/1994 |

(Continued)

OTHER PUBLICATIONS

Washino et al., "3D Touch Panel User Interface", Information Processing Society of Japan, Interaction 2009 (Mar. 2009), along with an English translation thereof.

(Continued)

*Primary Examiner* — Koosha Sharifi-Tafreshi
(74) *Attorney, Agent, or Firm* — Greenblum & Bernstein P.L.C.

(57) ABSTRACT

A display device is equipped with a proximity touch panel that detects coming into proximity or contact of a detection target; a position detection unit that detects position coordinates of the detection target whose coming into proximity or contact has been detected, the position coordinates consisting of coordinates in the X and Y directions and a coordinate in the Z direction; a display unit on which the touch panel is placed; a direction judgment unit that judges a direction of the detection target on the basis of the detected position coordinates; and a display control unit for controlling the display unit to perform a display so that a part of display contents of the display unit which would otherwise be hidden by the detection target is prevented from being hidden, on the basis of the direction of the direction-judged detection target.

21 Claims, 18 Drawing Sheets

(51) Int. Cl.
*G06F 3/044* (2006.01)
*G06F 3/0488* (2013.01)
*G06F 3/0481* (2013.01)

(56) References Cited

U.S. PATENT DOCUMENTS

| | | | |
|---|---|---|---|
| 2006/0244735 A1* | 11/2006 | Wilson | 345/173 |
| 2008/0278450 A1* | 11/2008 | Lashina | 345/173 |
| 2009/0021387 A1 | 1/2009 | Hosono | |
| 2009/0122007 A1 | 5/2009 | Tsuzaki et al. | |
| 2009/0122022 A1* | 5/2009 | Park et al. | 345/173 |
| 2009/0295715 A1 | 12/2009 | Seo et al. | |
| 2010/0090964 A1* | 4/2010 | Soo et al. | 345/173 |
| 2010/0107099 A1 | 4/2010 | Frazier et al. | |
| 2010/0169834 A1 | 7/2010 | Wakizaka et al. | |
| 2011/0018827 A1 | 1/2011 | Wang et al. | |
| 2011/0169746 A1 | 7/2011 | Kitajima | |
| 2011/0191723 A1* | 8/2011 | Wu et al. | 715/856 |
| 2011/0242038 A1 | 10/2011 | Kakuta et al. | |
| 2012/0050007 A1 | 3/2012 | Forutanpour et al. | |
| 2012/0120002 A1* | 5/2012 | Ota | 345/173 |
| 2012/0299849 A1* | 11/2012 | Homma et al. | 345/173 |

FOREIGN PATENT DOCUMENTS

| | | |
|---|---|---|
| JP | 2002-358162 | 12/2002 |
| JP | 2006-520024 | 8/2006 |
| JP | 2006-285491 | 10/2006 |
| JP | 2008-065630 | 3/2008 |
| JP | 2008-250948 | 10/2008 |
| JP | 2009-026155 | 2/2009 |
| JP | 2009-26155 | 2/2009 |
| JP | 2009-064109 | 3/2009 |
| JP | 2009-116769 | 5/2009 |
| JP | 2010-061372 | 3/2010 |
| JP | 2010-152827 | 7/2010 |
| JP | 2011-028560 | 2/2011 |
| WO | 2010/073329 | 7/2010 |
| WO | 2012/027422 | 3/2012 |

OTHER PUBLICATIONS

International Search Report and Written Opinion for PCT/JP2012/003210, mail date is Aug. 21, 2012, along with an English translation of ISR.

* cited by examiner

DISPLAY DEVICE, DISPLAY CONTROL METHOD AND DISPLAY CONTROL PROGRAM, AND INPUT DEVICE, INPUT ASSISTANCE METHOD AND PROGRAM

TECHNICAL FIELD

The present invention relates to a display device, a display control method, and a display control program for controlling the display of a display unit which is provided with a touch panel, as well as to an input device, an input assistance method, and a program for receiving an input manipulation made on a touch panel.

BACKGROUND ART

A proximity touch panel technology which is applicable to display devices is known in the art. The proximity touch panel technology is a technology which, by detecting not only positions in the X and Y directions which are parallel with a panel but also a position in the Z direction which is perpendicular to the panel, enables processing corresponding to an XYZ coordinate position (refer to Non-patent document 1, for example).

One proximity touch panel device is known which calculates a distance between the screen of a display unit and a commanding means (finger, stylus pen, or the like) and changes the contents of a display according to the calculated distance (refer to Patent document 1, for example).

PRIOR ART DOCUMENTS

Patent Documents

Patent document 1: JP-A-2008-250948

Non-Patent Documents

Non-patent document 1: Hiroyuki Washino, Yuichi Okano, and Takenori Kawamata, "3D Touch Panel Interface," Information Processing Society of Japan, Interaction 2009.

SUMMARY OF THE INVENTION

Problems to be Solved by the Invention

However, the proximity touch panel device of Patent document 1 which is the above-described conventional display device is associated with the following problem because it does not take a direction of a finger or the like into consideration. If the contents of a display are changed merely by an action that a finger or the like is brought close to the proximity touch panel, part of new display contents may be hidden unexpectedly by a finger or the like and is thereby rendered difficult to see, lowering the visibility of display contents for the user.

The present invention has been made in the above circumstances, and an object of the invention is to provide a display device, a display control method, and a display control program which allow a user to visually recognize information displayed on the screen easily while he or she is using a touch panel.

Means for Solving the Problems

A display device according to one embodiment of the invention comprises a touch panel that detects coming into proximity or contact of a detection target; a position detection unit that detects position coordinates of the detection target whose coming into proximity or contact has been detected by the touch panel, the position coordinates including coordinates in X and Y directions that are parallel with a surface of the touch panel and a coordinate in a Z direction that is perpendicular to the surface of the touch panel; a display unit on which the touch panel is placed; a direction judgment unit that judges a direction of the detection target on the basis of the position coordinates detected by the position detection unit; and a display control unit for controlling the display unit to perform a display so that a part of display contents of the display unit which would otherwise be hidden by the detection target are prevented from being hidden, on the basis of the direction of the detection target judged by the direction judgment unit.

With this configuration, the display of the display unit is controlled according to a direction of a detection target so that that portion of the screen of the display unit which is hidden by the detection target is not used. As a result, when the screen of the display unit is touched by a detection target such as a finger, display items displayed on the screen are prevented from being hidden by the detection target. When the touch panel is used, the user can easily recognize information displayed on the screen. Thus, the visibility for the user of display contents is not lowered.

A display control method according to one embodiment of the invention is a display control method of a display device having a touch panel that detects coming into proximity or contact of a detection target, comprising the steps of detecting position coordinates of the detection target whose coming into proximity or contact has been detected by the touch panel, the position coordinates including coordinates in X and Y directions that are parallel with a surface of the touch panel and a coordinate in a Z direction that is perpendicular to the surface of the touch panel; judging a direction of the detection target on the basis of the detected position coordinates; and controlling a display unit on which the touch panel is placed to perform a display so that a part of display contents of the display unit which would otherwise be hidden by the detection target is prevented from being hidden, on the basis of the direction of the direction-judged detection target.

With this method, the display of the display unit is controlled according to a direction of a detection target so that that portion of the screen of the display unit which is hidden by the detection target is not used. As a result, when the screen of the display unit is touched by a detection target such as a finger, display items displayed on the screen are prevented from being hidden by the detection target. When the touch panel is used, the user can easily recognize information displayed on the screen. Thus, the visibility for the user of display contents is not lowered.

A display control program according to one embodiment of the invention is a program for causing a computer which is a display device having a touch panel that detects coming into proximity or contact of a detection target, to execute the steps of detecting position coordinates of the detection target whose coming into proximity or contact has been detected by the touch panel, the position coordinates including coordinates in X and Y directions that are parallel with a surface of the touch panel and a coordinate in a z direction that is perpendicular to the surface of the touch panel; judging a direction of the detection target on the basis of the position coordinates detected by the position detection unit; and controlling a display unit on which the touch panel is placed to perform a display so that a part of display contents of the display unit which would otherwise be hidden by the detection target is prevented from being hidden, on the basis of the direction of the detection target judged by the direction judgment unit.

With this program, the display of the display unit is controlled according to a direction of a detection target so that that portion of the screen of the display unit which is hidden by the detection target is not used. As a result, when the screen of the display unit is touched by a detection target such as a finger, display items displayed on the screen are prevented from being hidden by the detection target. When the touch panel is used, the user can easily recognize information displayed on the screen. Thus, the visibility for the user of display contents is not lowered.

An input device according to one embodiment of the invention comprises a touch panel that detects coming into proximity or contact of a detection target; a position detection unit that detects position coordinates of the detection target whose coming into proximity or contact has been detected by the touch panel, the position coordinates including coordinates in X and Y directions that are parallel with a surface of the touch panel and a coordinate in a z direction that is perpendicular to the surface of the touch panel; a display unit on which the touch panel is placed; a pointer coordinates control unit that judges whether to display an indicator for pointing a position of a manipulation target designated by the detection target on the basis of information including the coordinate in the z direction detected by the position detection unit and a predetermined judgment condition; and a display control unit for controlling the display unit to display the indicator if the pointer coordinates control unit judges that the indicator should be displayed.

With this configuration, whether to display, on the screen, an indicator for pointing a target of an input manipulation performed by a user on the touch panel can be judged in a simplified manner according to the input manipulation. The user can thus enjoy ease of operation that is in a comfortable level.

An input assistance method according to one embodiment of the invention is an input assistance method of an input device having a display unit on which a touch panel is placed, comprising the steps of detecting coming into proximity or contact of a detection target by the touch panel; detecting position coordinates of the detection target whose coming into proximity or contact has been detected, the position coordinates including coordinates in X and Y directions that are parallel with a surface of the touch panel and a coordinate in a z direction that is perpendicular to the surface of the touch panel; judging whether to display an indicator for pointing a position of a manipulation target designated by the detection target on the basis of information including the detected coordinate in the z direction and a predetermined judgment condition; and controlling the display unit to display the indicator if it is judged that the indicator should be displayed.

With this method, whether to display, on the screen, an indicator for pointing a target of an input manipulation performed by a user on the touch panel can be judged in a simplified manner according to the input manipulation. The user can thus enjoy ease of operation that is in a comfortable level.

A program according to one embodiment of the invention is a program for causing a computer which is an input device having a display unit on which a touch panel is placed, to execute the steps of detecting coming into proximity or contact of a detection target by the touch panel; detecting position coordinates of the detection target whose coming into proximity or contact has been detected, the position coordinates including coordinates in X and Y directions that are parallel with a surface of the touch panel and a coordinate in a Z direction that is perpendicular to the surface of the touch panel; judging whether to display an indicator for pointing a position of a manipulation target designated by the detection target on the basis of information including the detected coordinate in the Z direction and a predetermined judgment condition; and controlling the display unit to display the indicator if it is judged that the indicator should be displayed.

With this program, whether to display, on the screen, an indicator for pointing a target of an input manipulation performed by a user on the touch panel can be judged in a simplified manner according to the input manipulation. The user can thus enjoy ease of operation that is in a comfortable level.

Advantages of the Invention

The invention allows a user to visually recognize information displayed on the screen easily while he or she is using a touch panel.

MODE FOR CARRYING OUT THE INVENTION (Embodiment 1)

A display device according to a first embodiment of the present invention will be hereinafter described with reference to the drawings.

The display device according to this embodiment is applied to a 3D touch panel device which incorporates a proximity touch panel capable of detecting not only positions in the X and Y directions which are parallel with the surface of the touch panel but also a position in the Z direction which is perpendicular to the touch panel.

Figure 1:
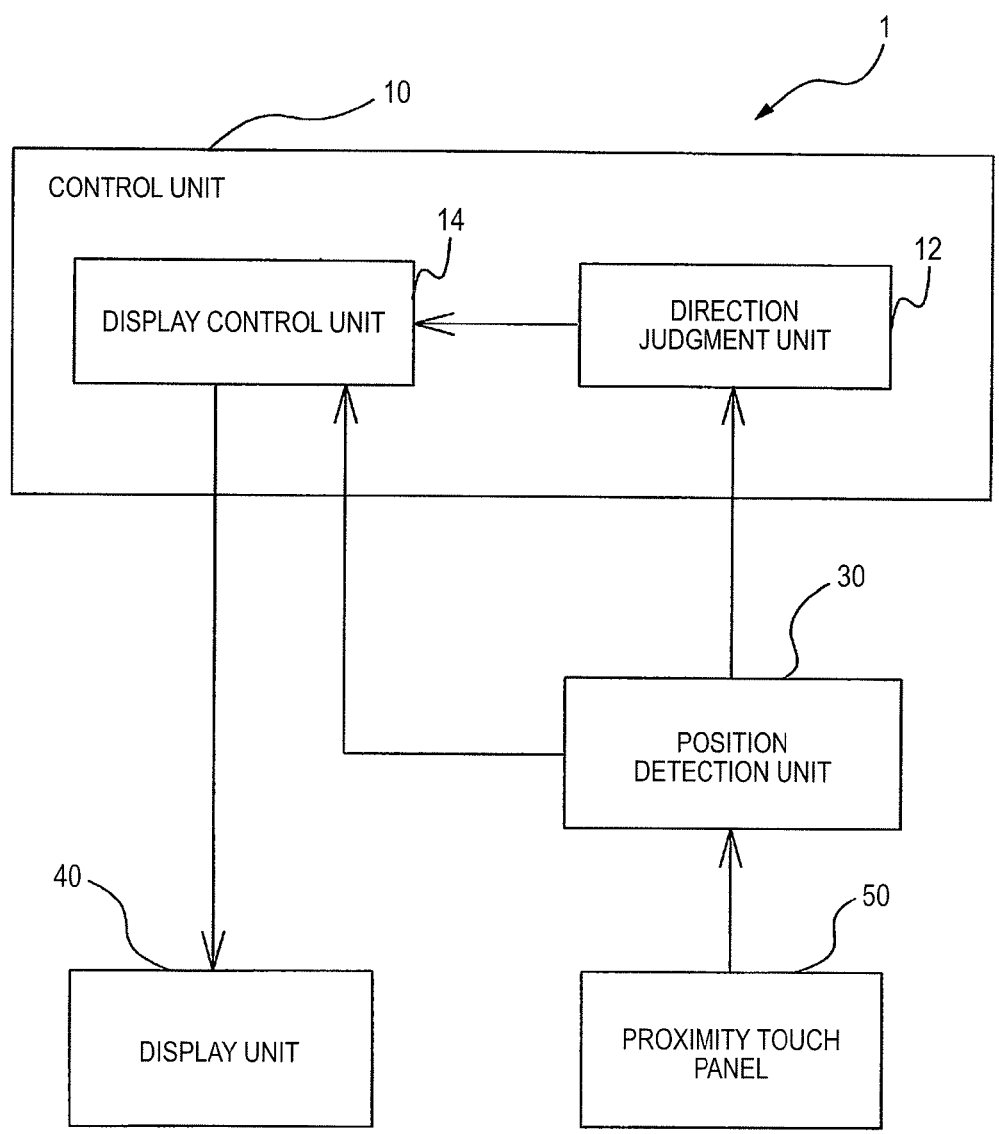
FIG. 1 is a block diagram showing an example functional configuration of a 3D touch panel device which is a display device according to a first embodiment.

FIG. 1 is a block diagram showing an example functional configuration of a 3D touch panel device 1 which is the display device according to the first embodiment. The 3D touch panel device 1 is composed of a control unit 10, a position detection unit 30, a display unit 40, and a proximity touch panel 50.

The control unit 10, which controls the entire 3D touch panel device 1, has a direction judgment unit 12, and a display control unit 14.

As described later, the direction judgment unit 12 judges a direction of a detection target such as a finger to come into contact with the proximity touch panel 50 on the basis of position coordinates detected by the position detection unit 30. A judgment method of the direction judgment unit 12 will be described later.

The display control unit 14 controls display of the display unit 40, and also controls, on the basis of a direction of a finger or the like communicated from the direction judgment unit 12, controls the display position of a pop-up picture such as a balloon which is displayed when a finger or the like comes close. At this time, the display control unit 14 controls, on the basis of a direction of a detection target such as a finger judged by the direction judgment unit 12, the display of the display unit 40 so as to avoid use of that portion of the display unit 40 which is hidden by the detection target.

The position detection unit 30 detects a position of a finger or the like that is close to or in contact with the proximity touch panel 50, that is, coordinates in the X and Y directions which are parallel with the proximity touch panel 50 and a coordinate in the Z direction that is perpendicular to the proximity touch panel 50 on the basis of an output of the proximity touch panel 50, and communicates the detected position to the direction judgment unit 12 the control unit 10. That is, the position detection unit 30 detects position coordinates, including coordinates in the X and Y directions and a coordinate in the Z direction, of a detection target such as a finger that has been detected as being close to the proximity touch panel 50.

The display unit 40, which is a liquid crystal display (LCD) or an organic EL (electroluminescence) display, displays various icons etc. on the screen. The proximity touch panel 50 is provided on the display unit 40.

The proximity touch panel 50 is a capacitive touch panel that is provided on the screen of the display unit 40 and is capable of multiple-point detection. That is, the proximity touch panel 50 detects whether a finger or the like as a detection target is close to or in contact with it. The proximity touch panel 50 outputs, to the position detection unit 30, a signal corresponding to a distance to the proximity touch panel 50 in the vertical direction (Z direction) utilizing a phenomenon that current values detected by sensors arranged in the X and Y directions which are parallel with the proximity touch panel 50 increase as a finger of a user, for example, comes closer to the proximity touch panel 50.

Figure 2:
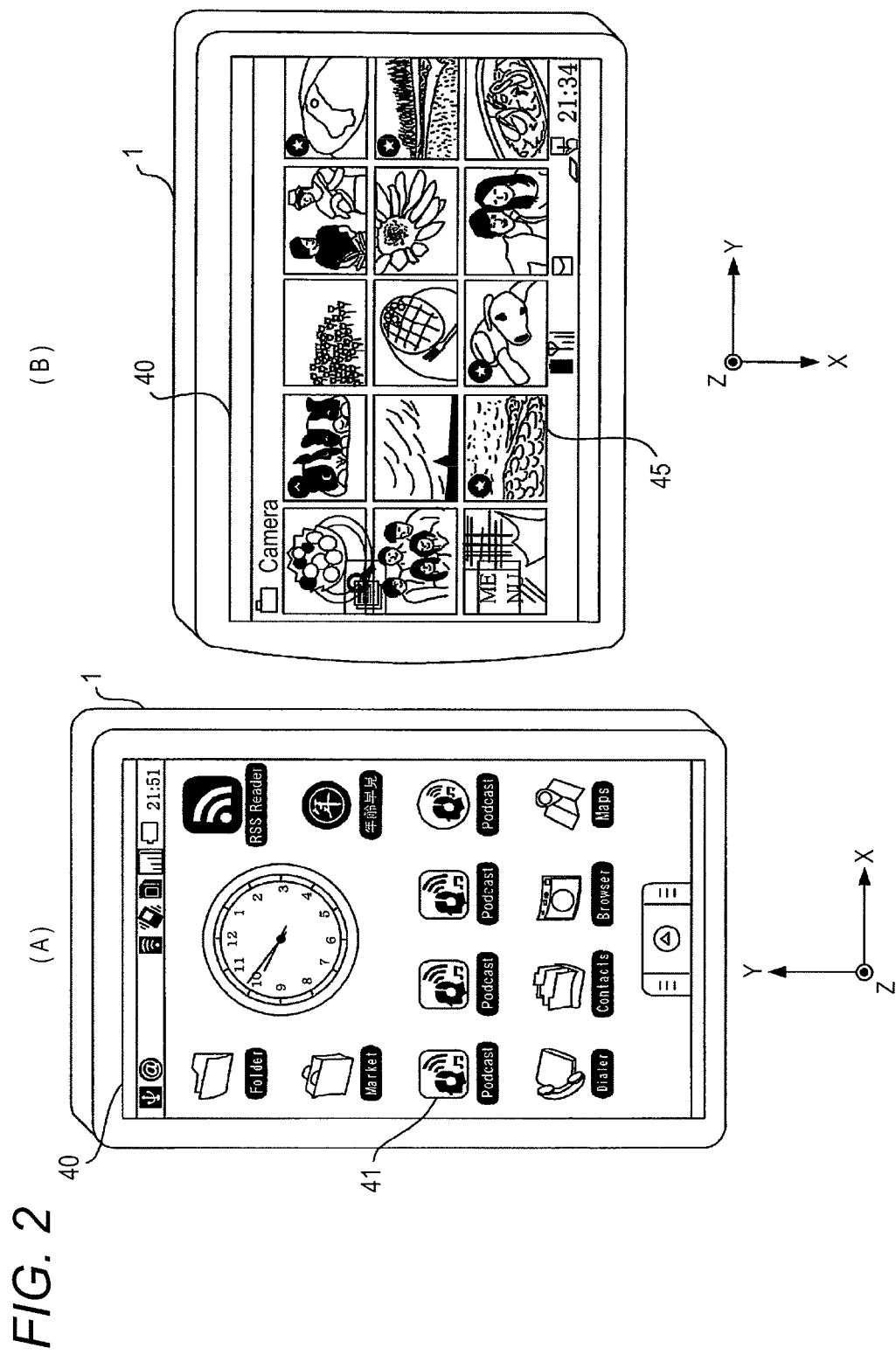
FIGS. 2(A) and 2(B) show an example appearance of the 3D touch panel device according to the first embodiment.

FIG. 2 shows an example appearance of the 3D touch panel device 1 according to the first embodiment. FIG. 2(A) shows a case that a menu picture is displayed on the display unit 40 with its longitudinal direction extending in the vertical direction. When one of various icons 41 in the menu picture is touched by a finger, processing corresponding to the touched icon 41 is performed by the control unit 10. FIG. 2(B) shows a case that a photograph list picture is displayed on the display unit 40 with its longitudinal direction extending in the horizontal direction. When a thumbnail 45 in the photograph list picture is touched, processing such as enlargement of the touched thumbnail 45 is performed.

Figure 3:
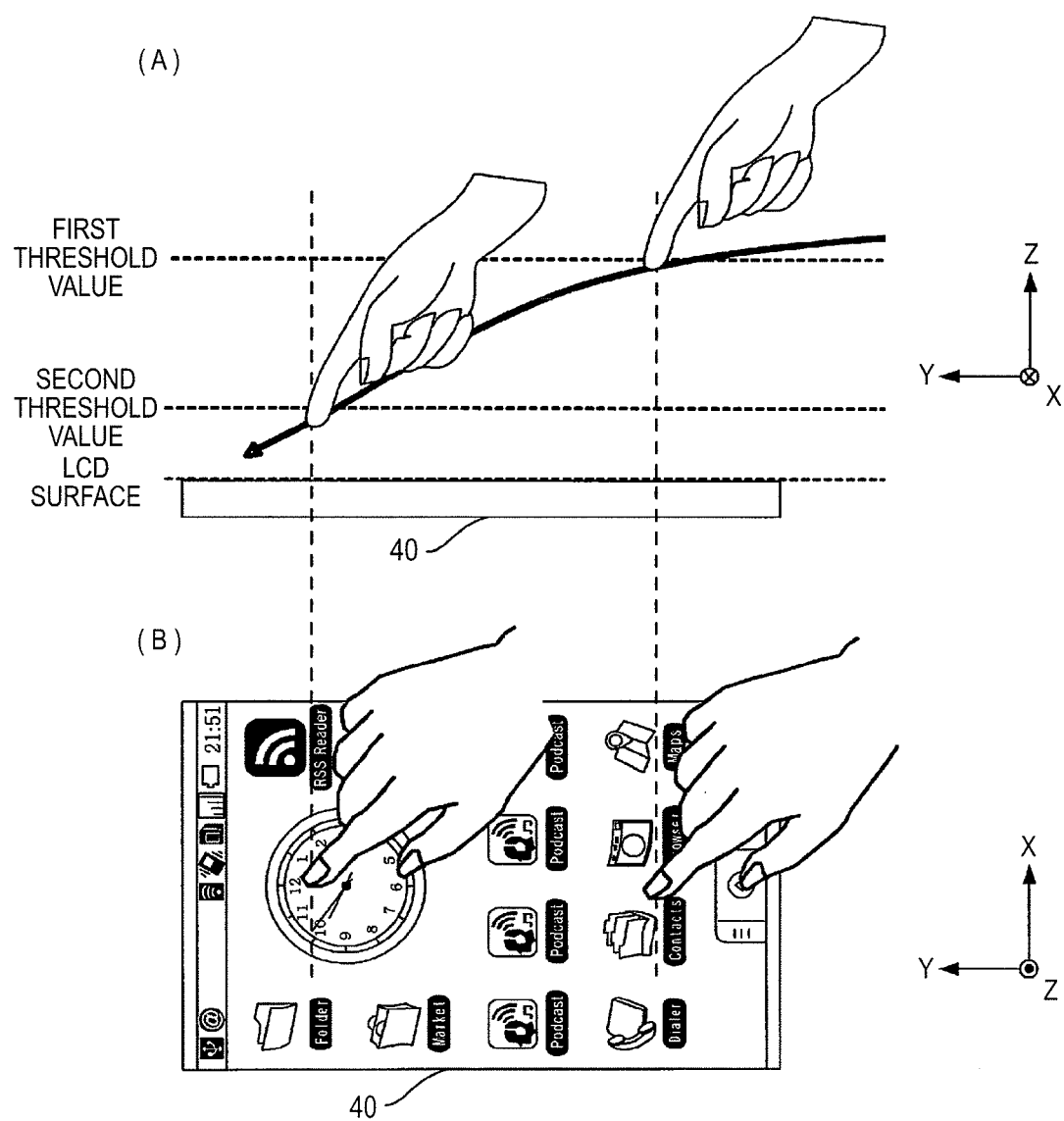
FIGS. 3(A) and 3(B) show an example height range of detection of a proximity touch panel used in the first embodiment.

In the 3D touch panel device 1 according to the first embodiment, as described later, a display on the screen of the display unit 40 is changed even in a state that a finger is close to the screen (not in contact with it yet; hovering). FIG. 3 shows an example height range of detection of the proximity touch panel 50 used in the first embodiment. FIG. 3(A) shows an example height range for a finger in the height direction with respect to the screen as viewed in the horizontal direction (thickness direction) of the proximity touch panel 50. FIG. 3(B) shows an example positional relationship between the proximity touch panel 50 and the finger as viewed from above the proximity touch panel 50.

In this embodiment, two threshold values (first threshold value and second threshold value) are set in the position detection unit 30. Based on a signal that is output from the proximity touch panel 50, the position detection unit 30 discriminates between proximity of a finger within the first threshold value (5 cm) and proximity of a finger within the second threshold value (1 cm). The first threshold value and the second threshold value can be set arbitrarily according to the specification of the proximity touch panel 50, ease of operation, etc. The degree of proximity of a finger may be judged by setting three of more threshold values.

An example display operation of the 3D touch panel device 1 having the above configuration will be described.

In the 3D touch panel device 1, when a finger (example detection target) has gone down in the height direction with respect to the screen (LCD surface) and reached a first coordinate range which is smaller than or equal to the first threshold value (e.g., 5 cm), the direction judgment unit 12 judges a direction of the finger. When the finger has gone down further and reached a second coordinate range which is smaller than or equal to the second threshold value (e.g., 1 cm), a pop-up picture of an item (icon 41 or thumbnail 45) corresponding to the finger position s displayed according to the finger direction. When the finger has come into contact with the proximity touch panel 50, processing corresponding to an item touched by the finger is performed by the control unit 10. It is possible to perform an operation corresponding to a finger direction also when contact is made.

As described above, the direction judgment unit 12 judges a direction of a detection target such as a finger if the z coordinate of the detection target detected by the position detection unit 30 is in the first coordinate range. And the display control unit 14 controls the display of the display unit 40 so as to avoid use of that portion of the screen of the display unit 40 which is hidden by the detection target if the z coordinate of the detection target is in the second coordinate range. With this measure, the 3D touch panel device 1 can perform processing step by step according to the spatial position of a finger (detection target) in the Z direction.

Figure 4:
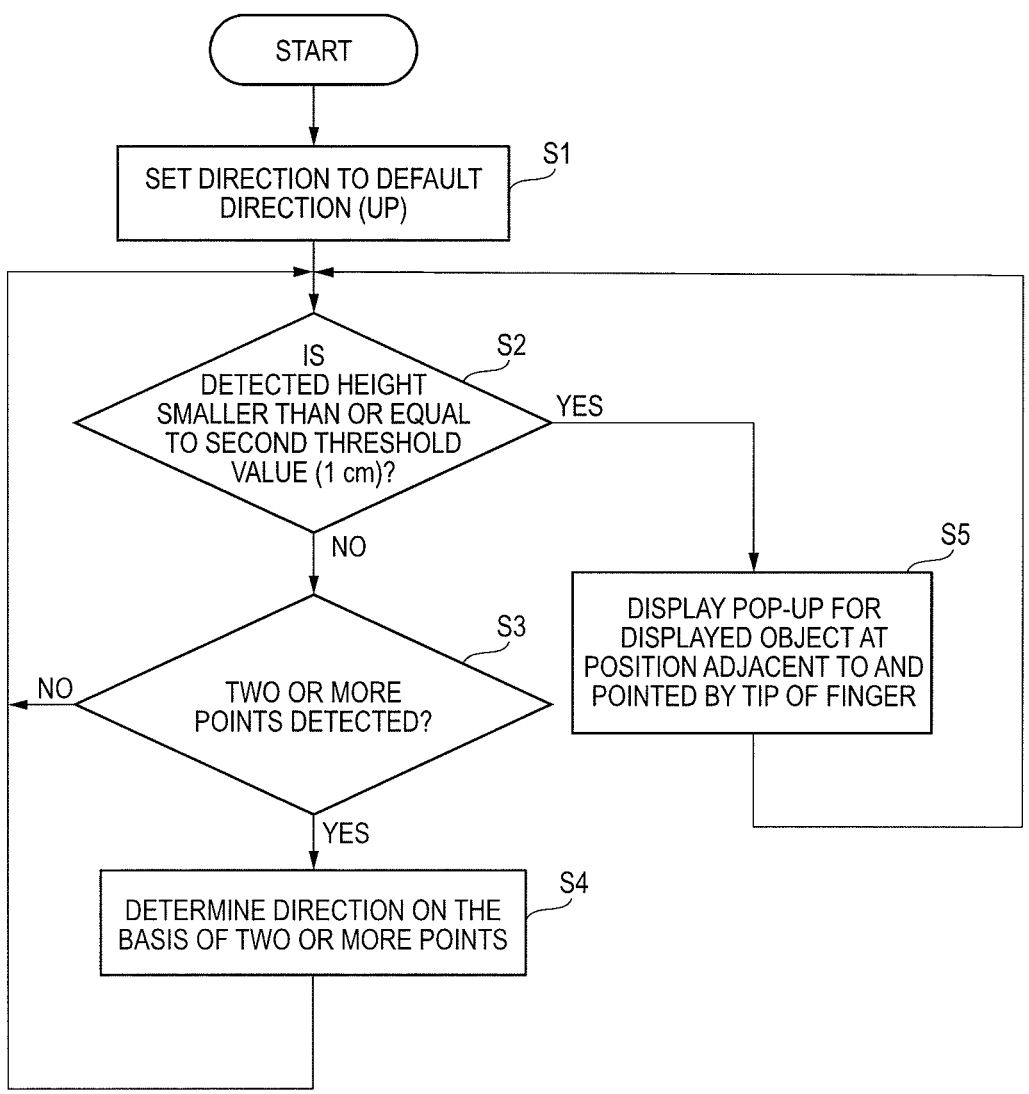
FIG. 4 is a flowchart showing an example display control procedure of the 3D touch panel device according to the first embodiment.

FIG. 4 is a flowchart showing an example display control procedure of the 3D touch panel device 1 according to the first embodiment. This display control program is stored in a ROM of the control unit 10, and is run by a CPU of the control unit 10 as interrupt processing when the position detection unit 30 detects a finger being located within the first threshold value (5 cm). This processing is stopped if the finger comes not to be detected as being located within the first threshold value (5 cm).

First, the control unit 10 sets the finger direction to a default direction "up" (step S1). In the embodiment, the finger direction can be set to any of eight directions, that is, up, down, left, right, top-right, bottom-right, top-left, and bottom-left. The finger direction settable directions are not limited to the eight directions and may be arbitrary directions.

The CPU 10 then judges whether or not the position detection unit 30 has detected a finger as being located within the second threshold value (1 cm) (step S2). If the height of a finger exceeds the second threshold value (step S2: no), the control unit 10 judges whether or not the proximity touch panel 50 has detected two or more points (step S3).

If only one point is detected (step S3: no), the control unit 10 returns to step S2. On the other hand, if two or more points are detected (step S3: yes), the direction judgment unit 12 determines a direction of the finger on the basis of positions of the two or more detection points (step S4). The process of CPU 10 then returns to step S2.

On the other hand, if the height of a finger is smaller than or equal to the second threshold value (1 cm) (step S2: yes), based on the finger direction determined at step S4, the display control unit 14 displays a pop-up picture adjacent to and pointed by the tip of the finger (see FIGS. 6(A) to 6(C); step S5). In this example, the pop-up picture is displayed at such a position as to be deviated from the tip of the finger in one, pointed by the tip of the finger, of eight directions. The process of CPU 10 then returns to step S2.

Figure 5:
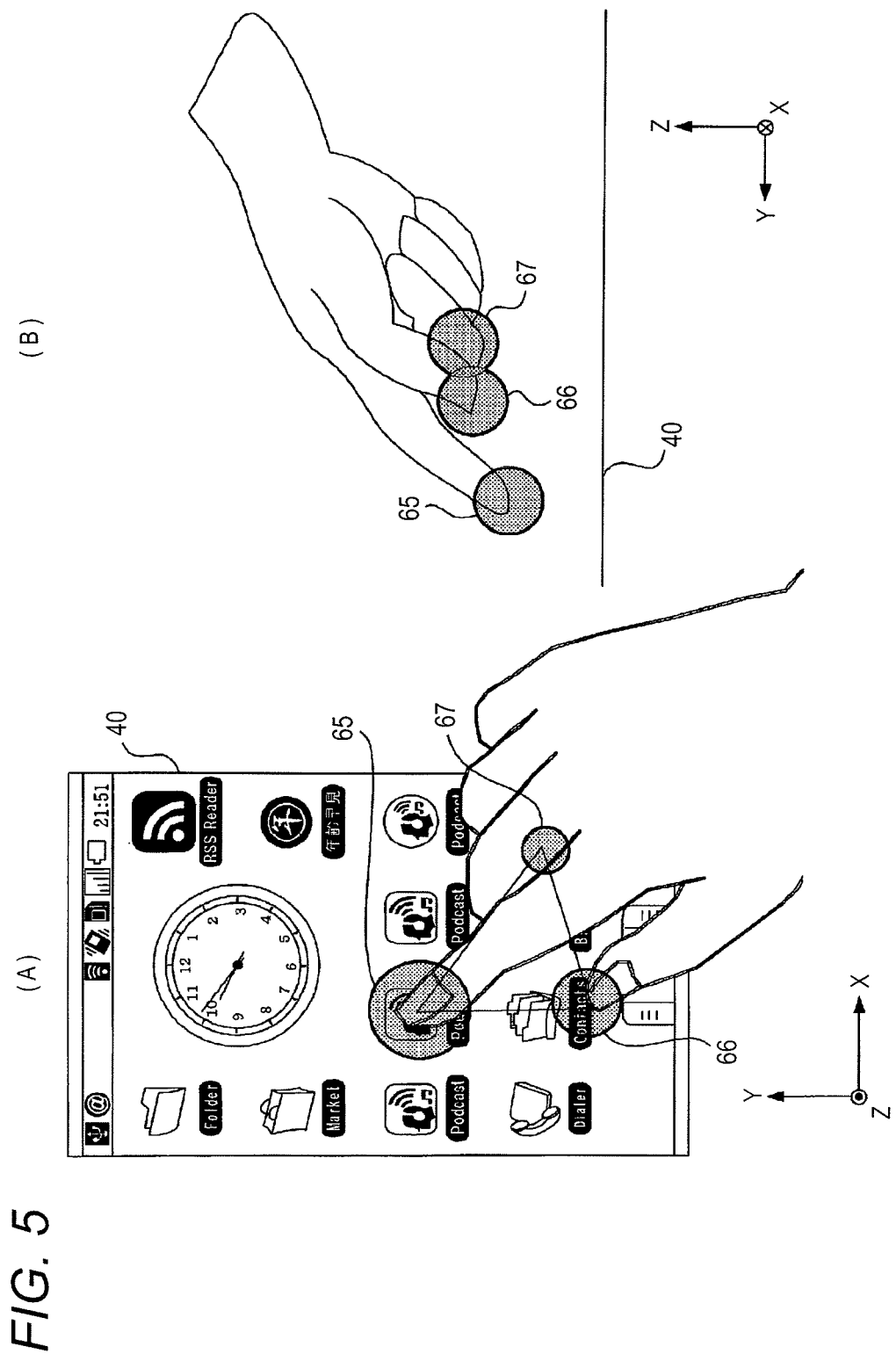
FIGS. 5(A) and 5(B) show an example method for determining a direction of a finger in the first embodiment.

FIG. 5 shows an example method for determining a direction of a finger at step S4 in the first embodiment. FIG. 5(A) shows an example of positions, as viewed from above the proximity touch panel 50, of hovering fingers that are close to the proximity touch panel 50. FIG. 5(B) shows an example of positions, as viewed in the horizontal direction (thickness direction) of the proximity touch panel 50, of the hovering fingers that are close to the proximity touch panel 50.

For example, when a touch manipulation is made by an index finger, usually the thumb and the middle finger are also located within the first threshold value (5 cm) and three points corresponding to these three fingers may be detected. In this case, as shown in FIG. 5(A), a triangle is formed by the detection points of the index finger, the thumb, and the middle finger when viewed from above the proximity touch panel 50 (in the Z direction). The direction judgment unit 12 determines a direction of the index finger on the basis of the inclination or shape of the triangle that has the detection point 65 of the index finger as the top apex and has, as the base, the line segment connecting the detection point 66 of the thumb and the detection point 67 of the middle finger. If the detection point (first point) of the middle finger that is third closest to the proximity touch panel 50 is located on the right of the straight line connecting the detection point (third point) of the index finger that is closest to the proximity touch panel 50 and the detection point (second point) of the thumb that is second closest to the proximity touch panel 50, the direction judgment unit 12 can judge that the right hand is being used. On the other hand, if the detection point (first point) of the middle finger is located on the left of the straight line, the direction judgment unit 12 can judge that the left hand is being used.

As described above, when sets of position coordinates of three points are detected by the position detection unit 30, the direction judgment unit 12 judges a direction of a detection target such as a finger on the basis of a positional relationship between a straight line connecting a first point having a largest z coordinate among the three points and a second point having a second largest z coordinate and a third point having a third largest z coordinate. For example, in the example of FIG. 5(B), the first point having a largest z coordinate is the detection point 65 of the index finger, the second point having a second largest z coordinate is the detection point 66 of the thumb, and the third point having a third largest z coordinate is the detection point 67 of the middle finger. Thus, the direction judgment unit 12 can determine a direction of the finger (e.g., index finger) reliably using the three detection points 65, 66, and 67.

Various other methods for determining a finger direction are conceivable. For example, when a touch manipulation is made by an index finger, two points (of the index finger and the thumb) may be detected. In this case, the direction judgment unit 12 determines a direction of the detection target (finger) on the basis of the direction of a vector that has, as the initial point, a detection point (first point) of the thumb having a large z coordinate and has, as the terminal point, a detection point (second point) of the index finger having a small z coordinate. In this manner, the direction judgment unit 12 can determine a finger direction easily even using two points. Furthermore, if a vector that has, as the initial point, a distant point (such as of a thumb) and has, as the terminal point, a point near the proximity touch panel 50 (such as of an index finger) and is directed up leftward is determined as a finger direction, the direction judgment unit 12 can judge, at the same time, that the right hand is being used.

The direction of an index finger varies depending on whether the thumb is located on the right or left of a straight line that passes through a detection point of the index finger and is parallel with the X axis or the Y axis. For example, the following operation is possible. The display control unit 14 identifies a display item such as an icon using a detection point (second point) of an index finger, for example. And the user intentionally controls the display position of a pop-up picture or the like for the display item by moving the detection point (first point) of the thumb to the right side or left side of a straight line as mentioned above. In this manner, the display control unit 14 may identify a display item being displayed on the screen of the display unit 40 using a second point of the two points and control the display position, on the display unit 40, of information relating to the identified display item according to position coordinates of a first point. Thus, the display control unit 14 can change the display position of such information flexibly according to a user operation.

When a touch manipulation is made by a thumb in the case of single-hand handling, the direction judgment unit 12 can determine a direction of the finger by detecting its cushion and root portion.

Where three or more points are detected, the direction judgment unit 12 may judge which of the right hand or the left hand is being used on the basis of on which side of a straight line determined by two detection points of an index finger and a thumb the number or area of detection points is larger.

In the embodiment, a finger direction is determined when two or more points are detected. However, even in the case of one detection point, when coordinates of another point are detected as being spaced from first-detected coordinates by a prescribed distance or more, the direction judgment unit 12 may judge that these two points are of different fingers and determine a finger movement direction on the basis of a movement direction of the detection points. The display control unit 14 may control the display position of a pop-up to adjacent to a movement destination.

In parallel with determining a finger direction at step S4, the display control unit 14 estimates an overlap range (overlap region) in an XY plane between a hand portion including the index finger and the screen of the display unit 40. The overlap range to be estimated is that range of the screen of the display unit 40 which would be hidden and rendered unseen by a hand portion around the index finger of the user himself or herself, and can be calculated on the basis of, for example, the number of detected points and their sets of position coordinates.

For example, the direction judgment unit 12 judges which of the right hand or the left hand is being used on the basis of a finger direction. If it is judged that the right hand is being used, the display control unit 14 judges that a geometrical shape having position coordinates of a detection point of the index finger as the top apex is a hand portion and calculates an overlap range in an XY plane between the hand portion and the screen of the display unit 40. In this manner, the display control unit 14 can quantitatively determine that range of the screen of the display unit 40 which would be hidden and rendered unseen.

As described above, the display control unit 14 estimates an overlap portion in an XY plane between a detection target and the screen of the display unit 40 and controls the display of the display unit 40 so as to avoid use of the overlap portion. This prevents necessary information from being hidden by the detection target such as a finger and thereby allows a user to recognize display contents easily. Thus, the visibility for the user of display contents on the display unit 40 is not lowered.

It is not necessary to determine a shape of a hand portion in the form of a strict shape; the display control unit 14 can calculate an overlap range easily by replacing it with a simple figure such as an ellipse or a tetragon. Alternatively, the display control unit 14 may always regard a range that is within a predetermined distance of a detection point as a hand portion. In this case, the display control unit 14 can employ a shape such as a tetragon having the top-left corner as the top apex in the case where an index finger having a detection point is of the right hand and employ a shape such as a tetragon having the top-right corner as the top apex in the case where an index finger having a detection point is of the left hand.

Although the above description is directed to the case that the determination of a finger direction and the judgment as to which of the right hand or the left hand is being used is made simultaneously, they need not always be made simultaneously. For example, a hand to be always used for touch manipulations may be registered in the display control unit 14 in advance. The display control unit 14 controls the display of a pop-up or the like so that it is not hidden and rendered unseen by the right hand or the left hand (e.g., it is displayed at a top-left position in the case of the right hand setting and at a top-right position in the case of the left hand setting).

Figure 6:
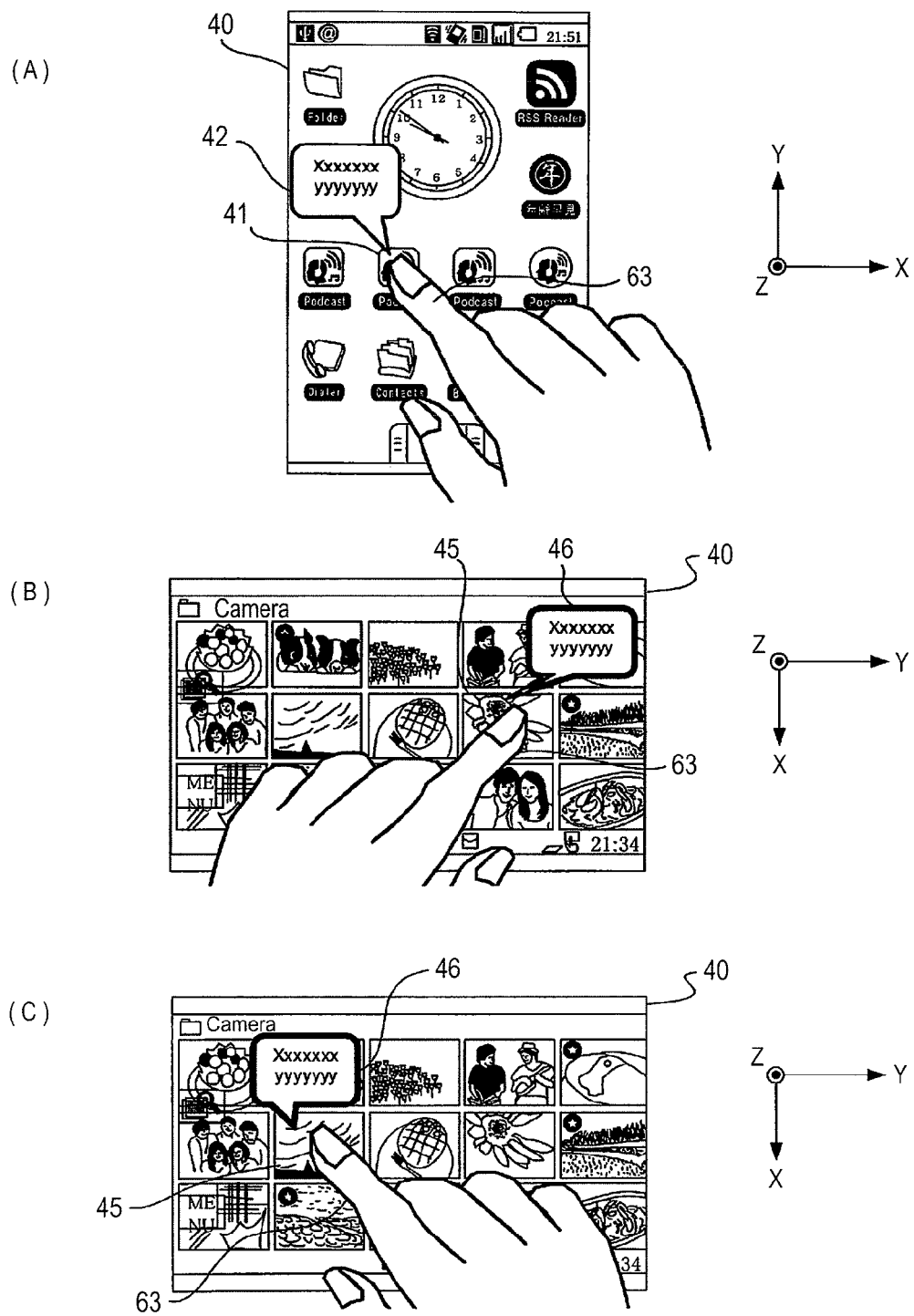
FIGS. 6(A)-6(C) show example pictures displayed on a display unit in the first embodiment in which a pop-up picture is displayed as a result of approach of a finger.

FIG. 6 shows example pictures displayed on the display unit 40 in the first embodiment in which a pop-up picture is displayed as a result of approach of a finger. FIG. 6(A) shows an example in which an instruction is made by the index finger of the right hand on a menu picture being displayed with the longitudinal direction extending in the vertical direction. In this case, a pop-up picture (balloon) 42 indicating the content of an icon 41 to which the index finger 63 has come close is displayed at a top-left position so as to escape from the index finger 63, that is, to avoid use of an overlap range as mentioned above.

FIG. 6(B) shows an example in which an instruction is made by the index finger of the left hand on a photograph list picture being displayed with the longitudinal direction extending in the horizontal direction. In this case, a pop-up picture (balloon) 46 indicating the content of a thumbnail 45 to which the index finger 63 has come close is displayed at a top-right position. FIG. 6(C) shows an example in which an instruction is made by the index finger of the right hand on a photograph list picture being displayed with the longitudinal direction extending in the horizontal direction. In this case, likewise, a pop-up picture (balloon) 46 indicating the content of a thumbnail 45 to which the index finger 63 has come close is displayed at a top-left position.

As described above, based on a direction of a detection target such as a finger that has been judged by the direction judgment unit 12, the display control unit 14 may control the display unit 40 so that it displays information (e.g., pop-up) relating to the display target at a position that is deviated from the detection target in its direction (e.g., in the case of the right hand, information is displayed on the top left of an icon or the like because the index finger is directed up leftward). This makes it possible to display a pop-up or the like at such a position that it can be seen more easily.

As described above, in the 3D touch panel device 1 according to the embodiment, when the proximity touch panel 50 is used by touch-manipulating an icon or a thumbnail being displayed on the screen with an index finger or the like, a pop-up picture is displayed so as to escape from the index finger or the like. As a result, in the 3D touch panel device 1, an event that an item displayed on the screen is hidden by a hand including an index finger or the like is avoided, whereby the user is allowed to visually recognize the item etc. displayed on the screen of the display unit 40 easily.

Although the above embodiment is directed to the case that a pop-up picture relating to an item to which a finger has come close is displayed, the picture whose display form is changed is not limited to a pop-up picture. The display control unit 14 may enlargement-display only an item to which a finger has come close according to a direction of the finger. Or the display control unit 14 may change the display of the entire screen so that items that would be displayed in a screen range (overlap range) covered with a hand including a finger escape from the overlap range by moving to the remaining screen portion.

When a finger has gone down from above the screen to be located within the first threshold value of the screen or has further gone down to be located within the second threshold value, the display control unit 14 may display information to that effect (i.e., the finger is hovering) on the screen of the display unit 40.

Figure 7:
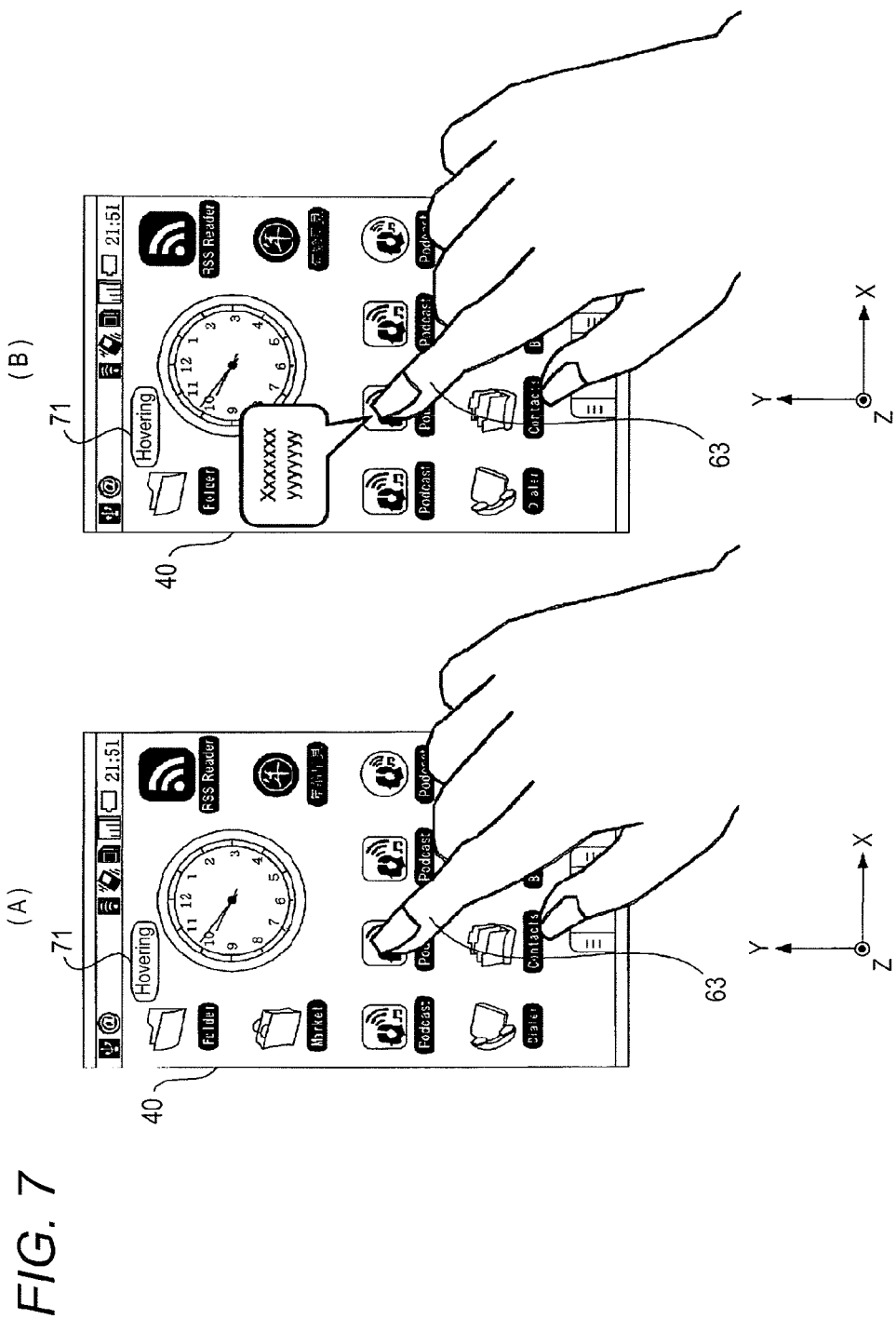
FIGS. 7(A) and 7(B) show example pictures displayed on the display unit in the first embodiment in cases that a finger is located within the first threshold value and the second threshold value, respectively.

FIG. 7 shows example pictures displayed on the display unit 40 in the first embodiment in cases that a finger is located within the first threshold value and within the second threshold value, respectively. In the example of FIG. 7(A), a text message 71 "Hovering" is displayed at a top position on the screen when a finger has come to be located within the first threshold value. In the example of FIG. 7(B), not only is a text message 71 "Hovering" displayed at a top position on the screen but also a pop-up indicating the content of an item is displayed on the screen when the finger has come to be located within the second threshold value. With this measure, the 3D touch panel device 1 can explicitly cause the user to recognize that the finger is hovering. The 3D touch panel device 1 may continue to display the text message 71 "Hovering" while a finger is located within the first threshold value or the second threshold value. In this case, the display control unit 14 may discriminate between a state that a finger is located within the first threshold value and a state that the finger is located within the second threshold value by changing the message content or the character attribute (e.g., color, size, or font).

Although the above embodiment is directed to the case that the proximity touch panel 50 detects a position of a finger or the like that is close to it, it may be configured so as to detect a conductive stylus pen instead of a finger.

The scope of the invention encompasses a program for implementing the functions of the embodiment, the program being supplied to the 3D touch panel device 1 via a network or any of various storage media and read out and run by a computer of the 3D touch panel device 1.

An input display device disclosed in Referential patent document 1 is known as a prior art technique relating to the proximity touch panel 50 according to the first embodiment. In the input display device disclosed in Referential patent document 1, a pointer is displayed at a position that is deviated from a finger position. When a user touches a small button or the like on the screen, the manipulation target button is prevented from being hidden by the finger. A manipulation for correctly determining a position where a finger manipulation should be made can be simplified.

(Referential patent document 1) JP-A-2009-26155

However, when a user attempts to manipulate a relatively large-sized object such as a large button or image, it is difficult to position a finger contrary to the intention because the position of a pointer pointing a manipulation position is deviated from an actual finger position. That is, even in the case of manipulating a large-sized object, the user cannot make an intuitive manipulation and, instead, needs to position a finger by moving it carefully while looking at a displayed pointer. As a result, a quick touch manipulation cannot be made and hence the ease of operation of the user is lowered.

An information processing apparatus disclosed in Referential patent document 2 is known as a prior art technique relating to the technique of displaying a pointer at a position that is deviated from a detection target in the first embodiment. This information processing apparatus is equipped with a pen input device. Whether to set an offset between a tip position of the pen input device to be manipulated and a position of a pen cursor displayed on the screen is switched for each region on the screen. This makes it possible to suppress reduction in ease of operation due to the offset.

(Referential patent document 2) JP-A-6-131120

However, in Referential patent document 2, an attribute indicating whether to set an offset needs to be determined in advance for each region on the screen. Therefore, it would be difficult to use this technique for general purposes. For example, it is difficult to determine an attribute in advance in the case of displaying a content that is described in HTML (hypertext markup language) using a web browser because whether targets to be touched are large or not depends on the content.

(Embodiment 2 to Embodiment 9)

In view of the above, input devices, input assistance methods, and programs which allow a user to enjoy a comfortable feeling of manipulation by judging, in a simplified manner, whether to display an indicator directly pointing a target of an input manipulation on the screen according to an input manipulation made on a touch panel by the user will be described in second and following embodiments.

<Description of Assumptions>

An input device according to each of the following embodiments can be incorporated in electronic apparatus including a display unit having a function of displaying various kinds of information or data on the screen. Specific examples of such electronic apparatus are cellphones, smartphones, tablet terminals, digital still cameras, PDAs (personal digital assistants), and e-book terminals. In the following description, each of the second and following embodiments will be directed to a case that the input device is a smartphone as a typical example.

The invention can be expressed in the form of a device (input device) or a program for causing an input device to operate as a computer. The invention can also be expressed in the form of an input assistance method including steps to be executed by an input device. That is, the invention can be expressed in any of categories of a device, a method, and a program.

The input device according to each of the following embodiments receives an input manipulation of a user and displays or does not display (erases), on the screen, an indicator (e.g., pointer PT) that directly points a position of the manipulation intended by the user for display contents (e.g., objects) displayed on the screen.

The input device according to each of the following embodiments can perform, for example, processing commanded by a user by receiving an input manipulation of the user. Examples of the object as a subject of processing are a data file of a processable content, a partial region of a content, an application (program), an icon that is correlated with a content or an application, and a hyperlinked character string. Specific examples of the content are a still picture, a moving picture, a character string, and combinations thereof.

Furthermore, typical examples of the processing performed in each of the following embodiments are as described below. However, the invention is not limited to those kinds of processing. First processing is processing of activating an application specified by a user manipulation. Second processing is processing of opening a file of a content specified by a user manipulation. Third processing is processing of performing a function specified by a user manipulation on an activated application. Fourth processing is processing of performing an edit specified by a user manipulation on a content being processed.

As described later, the input device according to each of the following embodiments can detect a position of a finger of a user on the user manipulation surface of a touch panel and the screen surface of a display unit or in a space close to those surfaces. To express this position, pieces of position information on three orthogonal axes, that is, the x axis, y axis, and z axis, are used. The x axis and the y axis are axes that are parallel with the surface of the touch panel, and the z axis is an axis that is perpendicular to the surface of the touch panel.

In the following description, two-dimensional coordinates (x,y) on the two axes are used to express a planar position of a finger or the like of a user that is in contact with the surface of the touch panel. Three-dimensional coordinates (x,y,z) on the three axes to express a spatial position of a finger or the like of a user that is close to a spatial position that is spaced from the surface of the touch panel. The position on the z axis of the three-dimensional coordinates (x,y,z) on the three axes represents a height in the direction (z direction) that is perpendicular to the surface of the touch panel.

Furthermore, in the following description, the term "hover manipulation" is defined as a manipulation of holding a finger at a spatial position that is spaced from the touch panel surface or sliding a finger from spatial position that is spaced from the touch panel surface approximately parallel with the touch panel surface. Therefore, a manipulation that a finger touches the touch panel surface directly is not a hover manipulation but a touch manipulation. It is preferable that the distance between a finger and the touch panel surface of a hovering manipulation correspond to a capacitance in such a range as to be detectable by the touch panel, because it is inversely proportional to a capacitance detected by the touch panel.

The term "hover-in" is defined as a state that a finger has been moved from a position sufficiently distant from the touch panel surface and brought close to the touch panel to cause a transition to a hover manipulation. Therefore, if the threshold z coordinate (height) of detection of coming into proximity of a finger by the touch panel is written as "zth," a state that a transition has been made to hover-in is a state that the distance between a finger and the touch panel (z coordinate, height) has become The term "hover-out" is defined as a state that a finger has been moved away from the touch panel surface from a state of a hover manipulation and the hover manipulation has thereby been canceled. Therefore, a state that a transition has been made to hover-out is a state that the distance between a finger and the touch panel (z coordinate, height) has become larger than the threshold value zth. Although here the threshold value zth is a length, it may be a capacitance, for example, in which case the unit of the threshold value zth is F (farad) rather than a length unit (e.g., cm).

<Example Configuration of 3D Touch Panel Device 1 Common to Second and Following Embodiments>

Figure 8:
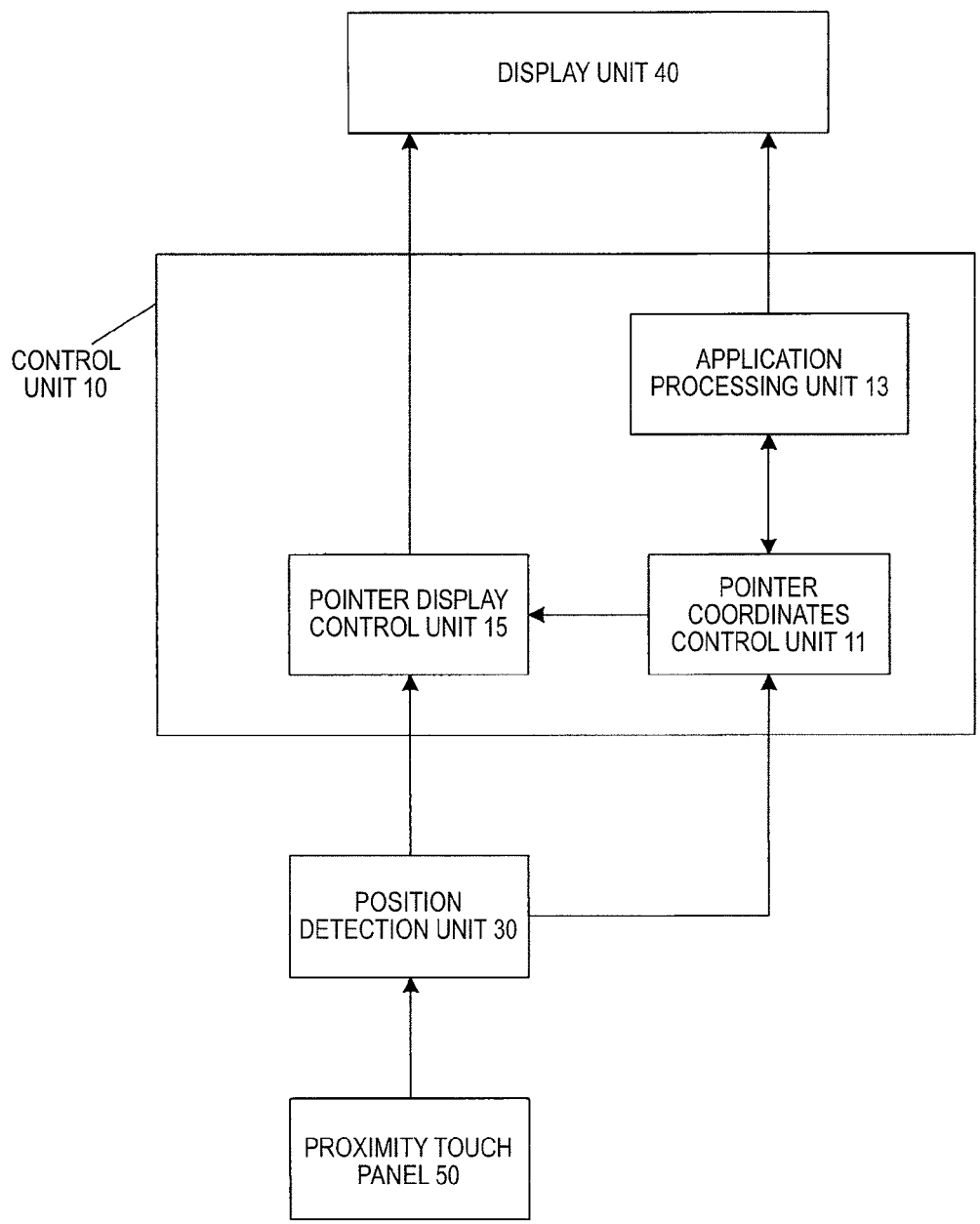
FIG. 8 is a block diagram showing an example functional configuration of a 3D touch panel device which is an input device according to each of second and following embodiments.

FIG. 8 is a block diagram showing an example functional configuration of a 3D touch panel device 1 which is the input device according to each of the second and following embodiments. The configuration of the 3D touch panel device 1 shown in FIG. 8 is common to all of the various embodiments described below.

As shown in FIG. 1, the 3D touch panel device 1 includes a control unit 10, a position detection unit 30, a display unit 40, and a proximity touch panel 50. The control unit 10 includes a pointer coordinates control unit 11, an application processing unit 13, and a pointer display control unit 15.

Having a planar manipulation surface, the proximity touch panel 50 (touch panel) can detect, for each minute region of the manipulation surface, that a detection target (e.g., finger or stylus) is close to or in contact with the manipulation surface. The proximity touch panel 50 acquires information of three-dimensional coordinates (x,y, z) of a detection target (e.g., a user finger) periodically (e.g., every 15 ms). The following description will be directed to a case that the detection target of the proximity touch panel 50 is a user finger. That is, a user can make an input manipulation on the 3D touch panel device 1 by bringing a finger close to the manipulation surface of the proximity touch panel 50. It is possible to use a pen or a stylus instead of a finger. In a specific example, the proximity touch panel 50 can detect a detection target such as a finger being in a close proximity state or a contact state by detecting the magnitude of a capacitance for each minute region of the manipulation surface.

The position detection unit 30 calculates and extracts three-dimensional coordinates (x,y,z) of a detection target such as a finger that is close to or in contact with the manipulation surface of the proximity touch panel 50. The position detection unit 30 detects, as a state of a detection target such as a finger, one of a "non-detection state," a "proximity state," and a "contact state." A proximity state is detected while a user finger is being hover-manipulated, and a contact state is detected while a user finger is being touch-manipulated.

The display unit 40, which is, for example, an LCD or an organic EL display having a display screen, displays visible information such as data or a pointer that is output from the control unit 10. The manipulation surface of the proximity touch panel 50 made of a transparent material is placed on the display screen of the display unit 40.

A control is made so that two-dimensional coordinates (x,y) of a finger manipulation position detected on the proximity touch panel 50 coincide with a position on the display screen of the display unit 40. Therefore, while looking at visible information (e.g., object) displayed on the display screen of the display unit 40, a user can make a manipulation with such a feeling that he or she is touching the visible information directly.

The control unit 10, which is configured by using a CPU (central processing unit), an MPU (microprocessing unit), or a DSP (digital signal processor), controls the 3D touch panel device 1 in a unified manner and performs various other kinds of computation processing and control processing. The control unit 10 performs various kinds of processing in each of the second and following embodiments by reading programs and data stored in a ROM (not shown) incorporated therein.

The pointer coordinates control unit 11 judges whether to display a pointer PT on the basis of three-dimensional coordinates (x,y,z) of a finger detected by the position detection unit 30 and a predetermined judgment condition, and outputs a judgment result to the pointer display control unit 15. The pointer coordinates control unit 11 detects a hover manipulation or a touch manipulation as a user input manipulation on the basis of three-dimensional coordinates (x,y, z) of a finger detected by the position detection unit 30 and a predetermined judgment condition, and outputs an instruction corresponding to the input manipulation to the application processing unit 13. The pointer coordinates control unit 11 refers to a status of the application processing unit 13 when necessary.

The application processing unit 13 runs one of various application programs automatically or according to a user input manipulation. The application processing unit 13 displays, on the display screen of the display unit 40, various kinds of visible information generated by an application program, such as a frame indicating the entire application, menus, buttons, and icons. The application processing unit 13 makes a judgment as to information of an application being executed or pieces of information of objects that are displayed in respective display regions of the display screen of the display unit 40, and outputs a judgment result to the pointer coordinates control unit 11.

The pointer display control unit 15 displays, on the display screen of the display unit 40, a pointer PT pointing a position of a manipulation target. A position where to display a pointer PT is determined on the basis of two-dimensional coordinates (x,y) of a finger or the like detected by the position detection unit 30. The display position of a pointer PT will be described later in detail. Whether to display a pointer PT on the display screen of the display unit 40 is determined on the basis of a judgment result of the pointer coordinates control unit 11.

<Example Picture Displayed on Display Unit 40>

Figure 9:
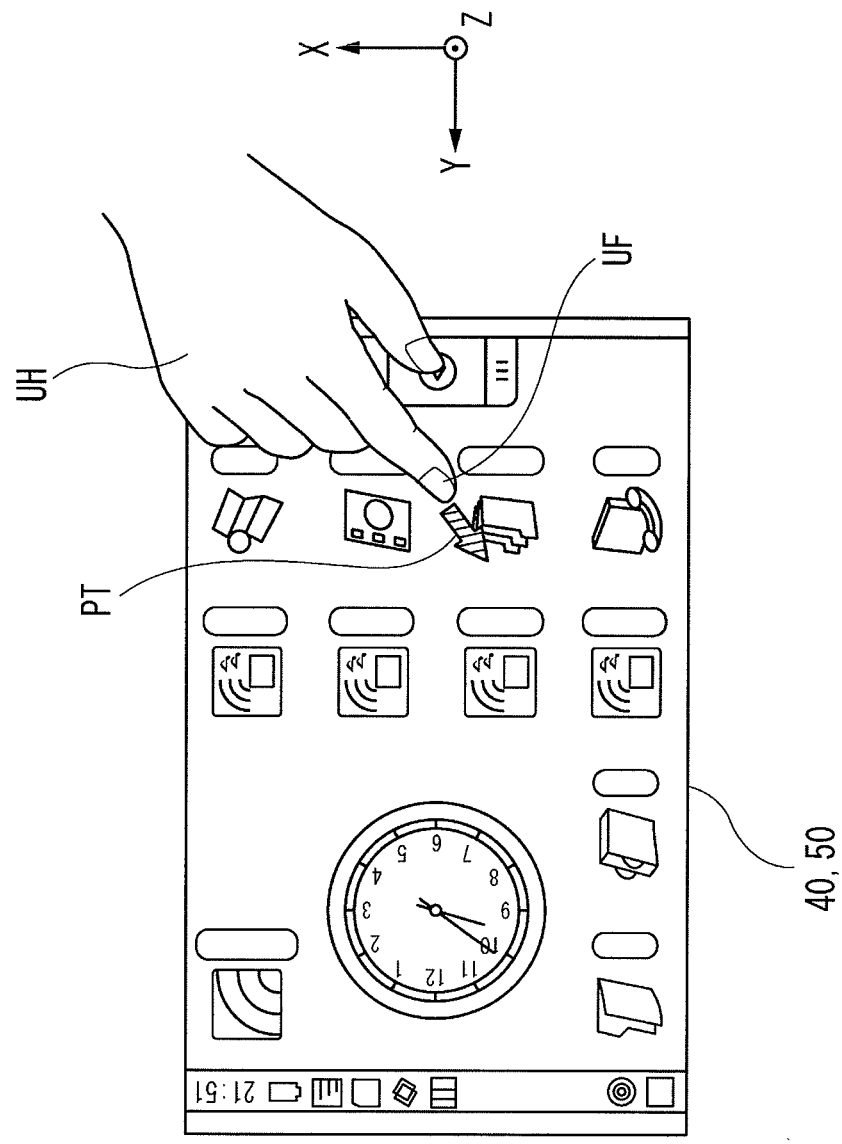
FIG. 9 shows specific examples of a picture displayed on a display unit of the 3D touch panel device and a position of a finger of a user.

FIG. 9 shows specific examples of a picture displayed on the display unit 40 of the 3D touch panel device 1 and a position of a finger UF of a user. As shown in FIG. 9, various kinds of visible information (objects) such as icons are displayed on the display screen of the display unit 40. Since the proximity touch panel 50 is placed on the display screen of the display unit 40, a user can make a desired input manipulation by bringing a finger UH close to the display screen and performing such a manipulation as to touch a desired manipulation target while looking at display contents on the display screen.

In the example of FIG. 9, an object having an arrow-shaped pattern is displayed as a pointer PT on the display screen. This pointer PT is controlled so that the arrow head points a position of a manipulation target. In the example of FIG. 9, the display position of the pointer PT is given prescribed offsets. That is, the pointer PT is not displayed at the position of two-dimensional coordinates (x, y) of a tip position of the user finger UF but at a position that is deviated from the two-dimensional coordinates (x,y) of the tip position of the user finger UF by the prescribed offsets.

In the 3D touch panel device 1, since as described above a pointer PT is not displayed at the position of two-dimensional coordinates (x,y) of a tip position of a user finger UF but at a position that is deviated from the two-dimensional coordinates (x,y) of the tip position of the user finger UF by prescribed offsets, the pointer PT or a small manipulation target object (e.g., icon or button) can be prevented from being hidden by the finger UF and rendered unseen to the user. Thus, the visibility of display contents on the display screen for the user can be increased.

<Specific Example of Finger Detection State>

Figure 10:
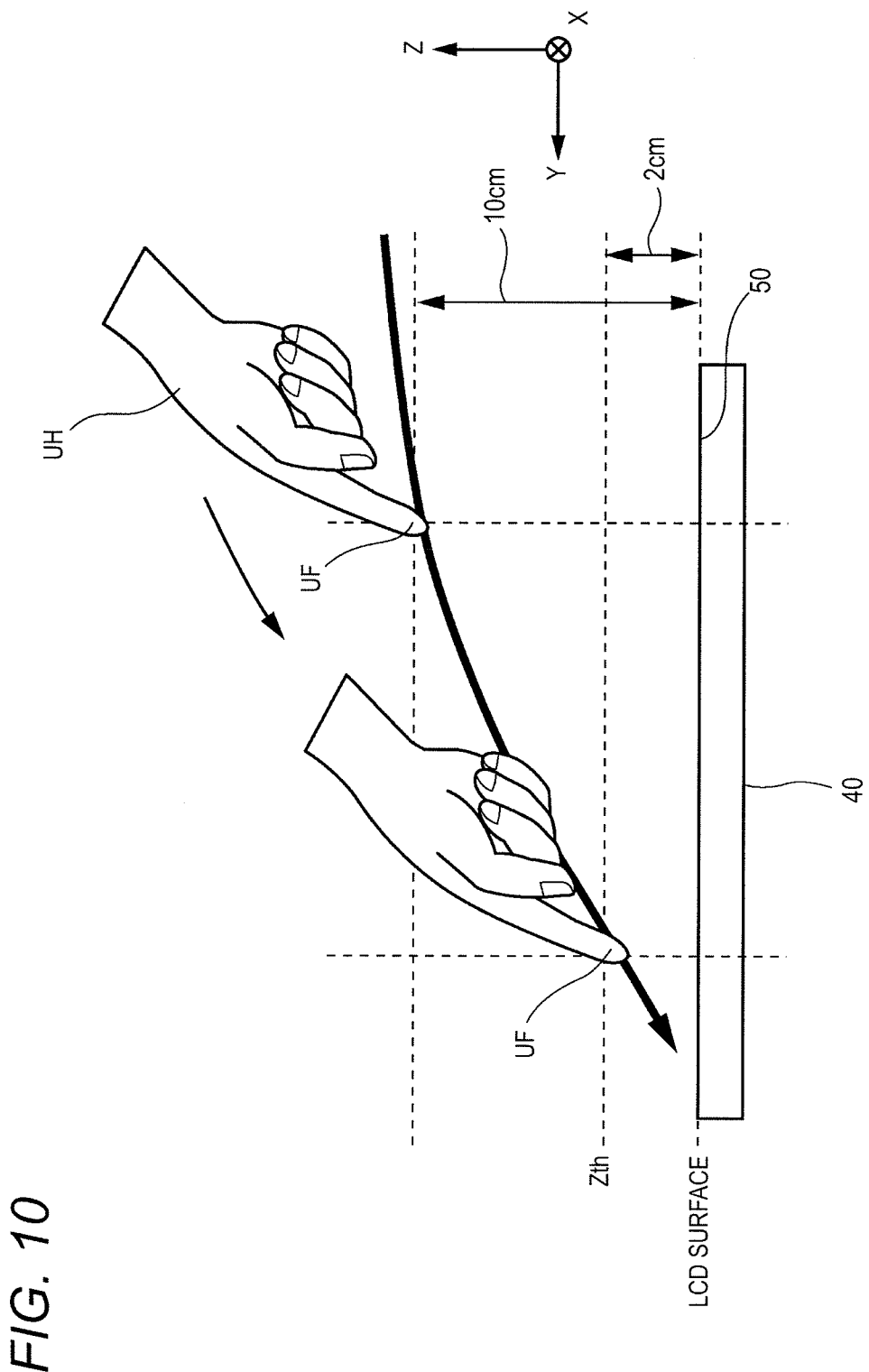
FIG. 10 shows a specific example of a positional relationship between a user finger and the manipulation surface of the 3D touch panel device.

FIG. 10 shows a specific example of a positional relationship between a user finger UF and the manipulation surface of the 3D touch panel device 1. According to theoretical values of the performance of the proximity touch panel 50 which is placed on the display screen of the display unit 40, as shown in FIG. 10, the proximity touch panel 50 can detect presence of a finger UF and three-dimensional coordinates (x,y,z) indicating its position if its distance from the display screen (the manipulation surface of the proximity touch panel 50) in the z direction is within 10 cm, for example. And the proximity touch panel 50 is rendered in a non-detection state if the distance becomes longer than 10 cm.

However, if a finger UF is too distant from the manipulation surface of the proximity touch panel 50, the proximity touch panel 50's accuracy of determination of a position of a finger UF may lower depending on the use situation of the 3D touch panel device 1. In view of this, as shown in FIG. 10, setting is made in the proximity touch panel 50 so that it receives a hover manipulation of a user finger UF when the distance of the user finger UF from the manipulation surface of the proximity touch panel 50 in the z direction is within 2 cm, for example. In this case, the threshold value zth for judgment as to whether or not the proximity touch panel 50 can detect a proximity state of a finger UF is set equal to 2 cm.

That is, the pointer coordinates control unit 11 compares the position in the z direction of three-dimensional coordinates (x,y,z) detected by the position detection unit 30 with the threshold value zth (2 cm) and judges whether a hover manipulation of a user finger UF is being performed or not. Therefore, as shown in FIG. 10, as a hand UH of a user hand UH is brought closer to the proximity touch panel 50, the non-detection state is canceled at a time point when the distance between the finger UF and the manipulation surface of the proximity touch panel 50 in the z direction becomes within 10 cm. On the other hand, the proximity touch panel 50 detects a hover-out state when the distance between the finger UF and the manipulation surface of the proximity touch panel 50 in the z direction has become longer than the threshold value zth (2 cm).

When the distance between a finger UF and the manipulation surface of the proximity touch panel 50 in the z direction has become shorter than or equal to the threshold value zth (2 cm), the proximity touch panel 50 detects a hover-in state in which a hover manipulation is being performed by the user finger UF. The proximity touch panel 50 detects that a touch manipulation has been performed by a user finger UF when detecting that the distance between the finger UF and the manipulation surface of the proximity touch panel 50 in the z direction has become shorter than a predetermined touch detection threshold value or detecting actual contact. The threshold value zth may be changed during operation of the 3D touch panel device 1.

<Operations of 3D Touch Panel Devices 1>

Next, how the 3D touch panel devices 1 as the input devices according to the second and following embodiments operate will be described with reference to FIGS. 11-18, respectively.

<Embodiment 2>

Figure 11:
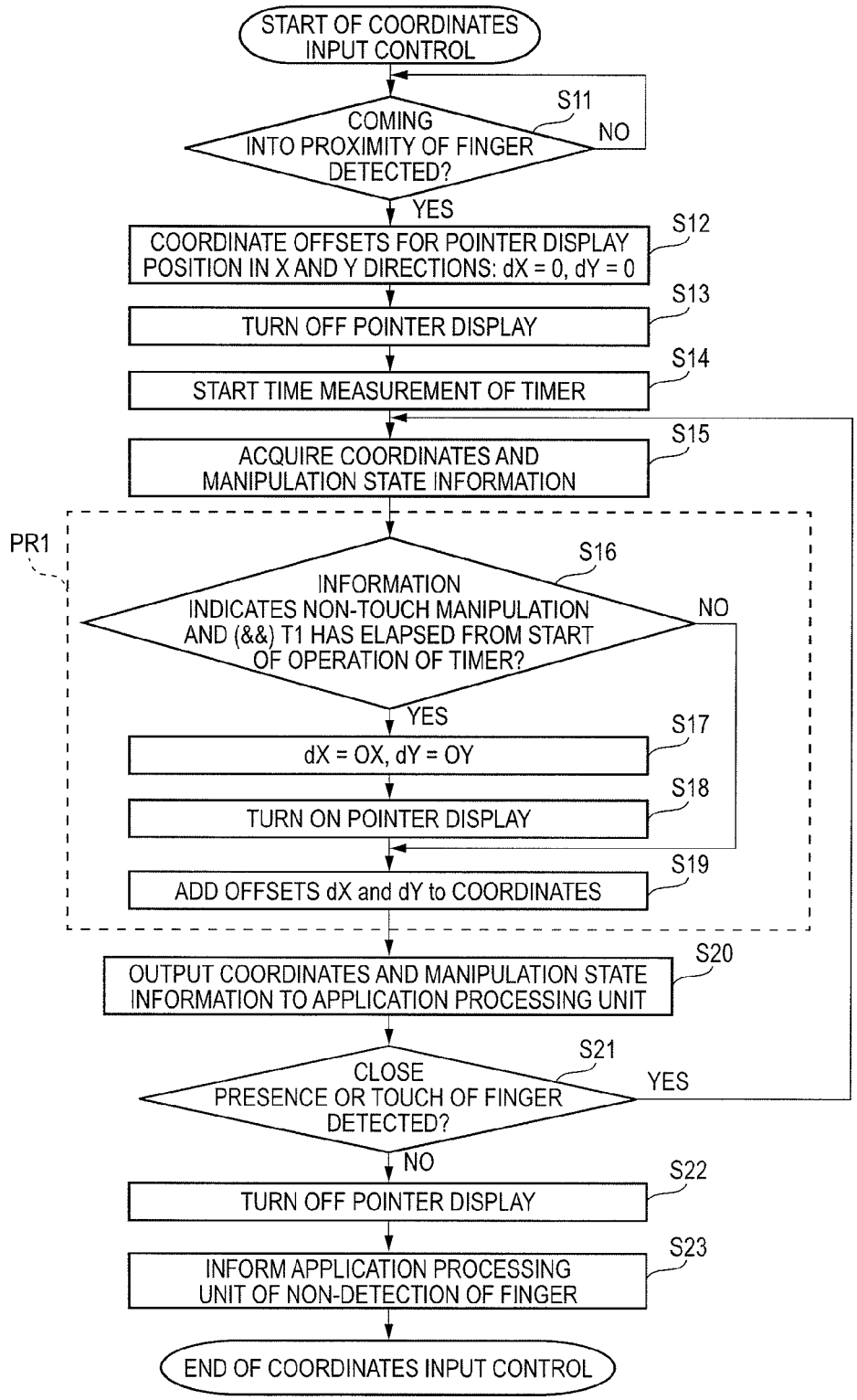
FIG. 11 is a flowchart showing how the 3D touch panel device according to a second embodiment operates.

FIG. 11 is a flowchart showing how the 3D touch panel device 1 according to the second embodiment operates. The pointer coordinates control unit 11 of the control unit 10 performs a control as to display/non-display of a pointer PT and controls the display position of a pointer PT by executing the process of the flowchart of FIG. 11. In the steps shown in FIG. 11, the equal sign "=" means substituting a value or the like on the right side into the left side, which also applies to FIG. 12 and the charts following it.

Upon a start of a coordinates input control shown in FIG. 11, the pointer coordinates control unit 11 monitors finger position coordinates that are output from the position detection unit 30 and stands by until detection of coming into proximity of a finger UF (S11). That is, the pointer coordinates control unit 11 compares a distance of a position of a finger UF from the manipulation surface of the proximity touch panel 50 in the z direction with the threshold value zth shown in FIG. 10 (S11). If a user finger UF has come close to the proximity touch panel 50 to cause a transition from a hover-out state to a hover-in state, that is, if the distance of the position of a finger UF from the manipulation surface of the proximity touch panel 50 in the z direction has become shorter than or equal to the threshold value zth (S11: yes), the process of the pointer coordinates control unit 11 moves to the next step S12.

The pointer coordinates control unit 11 initializes the coordinate offsets for a display position of a pointer PT (S12). That is, the pointer coordinates control unit 11 substitutes "0" into parameters dX and dY which represent the offsets in the x direction and y direction, respectively.

Therefore, at the initial state, the offsets are made equal to "0." The offsets mean a deviation between a display position of a pointer PT and two-dimensional coordinates (x,y) of a position on the proximity touch panel 50 that correspond to three-dimensional coordinates (x,y,z) of detection of coming into proximity of a finger UF.

The pointer coordinates control unit 11 controls the pointer display control unit 15 not to display a pointer PT (S13). To measure an elapsed time from a start of a hover manipulation, the pointer coordinates control unit 11 controls a timer (not shown) to start a time measurement operation (S14). Although the timer is not shown in FIG. 8 as a unit of the 3D touch panel device 1, it is provided in, for example, the control unit 10 and starts a time measurement operation in response to an instruction from each unit of the control unit 10. Elapsed time information that is counted by a time measurement operation of the timer is referred to by each unit of the control unit 10 when necessary.

To monitor the manipulation state of the user finger UF, the pointer coordinates control unit 11 acquires information of three-dimensional coordinates (x,y,z) representing a position of the finger UF from the 3D touch panel device 1 and acquires manipulation state information indicating a type (e.g., touch manipulation or hover manipulation) of a manipulation being performed by the user finger UF (S15).

In a step group PR1 which is executed after step S15, the pointer coordinates control unit 11 performs a display control for a pointer PT. The third, fourth, fifth, sixth, seventh, and eighth embodiments are different from each other in the details of step groups PR2, PR3, PR41, PR42, PR43, and PR5 enclosed by broken lines in FIGS. 12, 13, 14, 15, 16, and 17, respectively.

First, the pointer coordinates control unit 11 judges whether to display a pointer PT according to a predetermined judgment condition (S16). That is, in the step group PR1, the pointer coordinates control unit 11 judges whether or not the manipulation state information acquired at step S15 is information indicating a non-touch manipulation and a prescribed time T1 has elapsed from the start (made at step S14) of the time measurement operation of the timer (S16). If the manipulation state information is information indicating a non-touch manipulation (e.g., it indicates a hover manipulation; this also applies to the following description) and the prescribed time T1 has elapsed from the start of the time measurement operation of the timer (S16: yes), the pointer coordinates control unit 11 judges that a pointer PT should be displayed. The process of the pointer coordinates control unit 11 then moves to step S17.

On the other hand, if the manipulation state information is not information indicating a non-touch manipulation, that is, information indicating a touch manipulation or the prescribed time T1 has elapsed yet (S16: no), the pointer coordinates control unit 11 judges that a pointer PT should not be displayed. The process of the pointer coordinates control unit 11 then moves to step S19.

At step S17, the pointer coordinates control unit 11 substitutes predetermined constants OX and OY into the parameters dX and dY as offsets for a display position of a pointer PT, respectively (S17). In the following description, the constants OX and OY are prescribed positive values.

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S17 (S18). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S17 (S18). For example, the pointer PT is displayed on the extension in the direction indicated by the finger UF.

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S17 to the two-dimensional coordinates (x,y) on the proximity touch panel 50 corresponding to the three-dimensional coordinates (x,y,z) detected at step S11 as indicating the position of the finger UF (S19).

Although at step S19 the offsets (dX, dY) are added to the two-dimensional coordinates (x,y) on the proximity touch panel 50 corresponding to the three-dimensional coordinates (x,y,z) detected at step S11 as indicating the position of the finger UF, the offsets (dX, dY) may be either added or subtracted according to the direction of the finger UF. This also applies to each of the following embodiments.

For example, after judging the direction of the user finger UF in the manner described in the first embodiment, the pointer coordinates control unit 11 subtracts the offset dX and adds the offset dY if the finger UF is directed to the negative side of the X axis and to the positive side of the Y axis (see FIG. 9). The pointer coordinates control unit 11 adds the offset dX and subtracts the offset dY if the finger UF is directed to the positive side of the X axis and to the negative side of the Y axis. This manner of addition or subtraction of an offset also applies to each of the following embodiments.

If it is judged at step S16 that the prescribed time T1 has not elapsed yet, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y, z) of the finger UF detected at step S11 (S19).

The pointer coordinates control unit 11 communicates, to the application processing unit 13, the display position of the pointer PT as corrected through addition or subtraction at step S19, that is, the coordinates of the position indicating the user manipulation target, and the manipulation state information (i.e., information indicating such a state as occurrence/non-occurrence of a touch) of the user finger UF (S20). The application processing unit 13 can receive an input manipulation such as a touch made by the user finger UF.

While judging, on the basis of the output of the position detection unit 30, that a touch manipulation or a hover manipulation is being performed (S21: yes), the pointer coordinates control unit 11 executes steps S15-S21 repeatedly. If the user finger UF is spaced from the manipulation surface of the proximity touch panel 50 by more than the threshold value zth (S21: no), the process of the pointer coordinates control unit 11 moves to step S22.

The pointer coordinates control unit 11 controls the pointer display control unit 15 to turn off the display of the pointer PT (S22), and informs the application processing unit 13 that a hover manipulation of a finger UF is not detected (S23). The process of FIG. 11 is executed repeatedly. That is, after the execution of step S23, the process returns to step S11 and steps S11-S23 are executed again.

By executing the process of FIG. 11, the pointer coordinates control unit 11 according to this embodiment can automatically switch between display and non-display of a pointer PT. That is, a pointer PT is not displayed at the initial state. A non-display state of a pointer PT is maintained until the prescribed time T1 (e.g., 1 s) elapses after a transition from hover-out to hover-in (hover manipulation state) caused by a user manipulation of bringing a finger close to the manipulation surface. When the prescribed time T1 has elapsed from the transition to hover-in (hover manipulation state), switching is made to a display state of a pointer PT. If a transition is then made to hover-out from a touch manipulation state or a hover manipulation state because of a user manipulation of moving the finger away, switching is made to a non-display state of a pointer PT.

While a pointer PT is displayed, a user manipulation position is deviated from an actual finger position by offsets (dx, dy). While a pointer PT is not displayed, influence of offsets disappears and a user manipulation position coincides with an actual finger position.

For example, when a user attempts to manipulate a relatively large button displayed on the screen by touching it with a finger, the user can touch the button quickly with the finger because the manipulation target region has a large area. In this case, because of a short time required by a finger manipulation, the touch manipulation is finished before a lapse of the prescribed time T1 from a transition from hover-out to hover-in (hover manipulation state). Therefore, in this case, non-display of a pointer PT is maintained and a manipulation position is not influenced by offsets. Thus, the user can complete the input manipulation quickly by making an intuitive finger manipulation.

On the other hand, when a user attempts to manipulate a relatively small button displayed on the screen by touching it with a finger, since the manipulation target region has a small area, the user needs to finely adjust the manipulation finger position. In this case, whereas a pointer PT is not displayed at the beginning, a pointer PT is displayed automatically if the prescribed time T1 has elapsed from a transition from hover-out to hover-in (hover manipulation state) with no state change. A display position of the pointer PT is deviated from a finger position by the offset (dx, dy). Therefore, even if the user brings the finger close to the manipulation surface, the manipulation target button or the pointer PT is not hidden by the finger and hence the finger can be positioned easily.

As is understood from the above description, in the 3D touch panel device 1 according to this embodiment, a user can easily make an input manipulation through a finger touch on both of a button having a large area and a button having a small area. Furthermore, since it is not necessary to determine, in advance, whether to display a pointer PT, the 3D touch panel device 1 is high in versatility and can be used for various purposes irrespective of the kind of objects.

<Embodiment 3>

Figure 12:
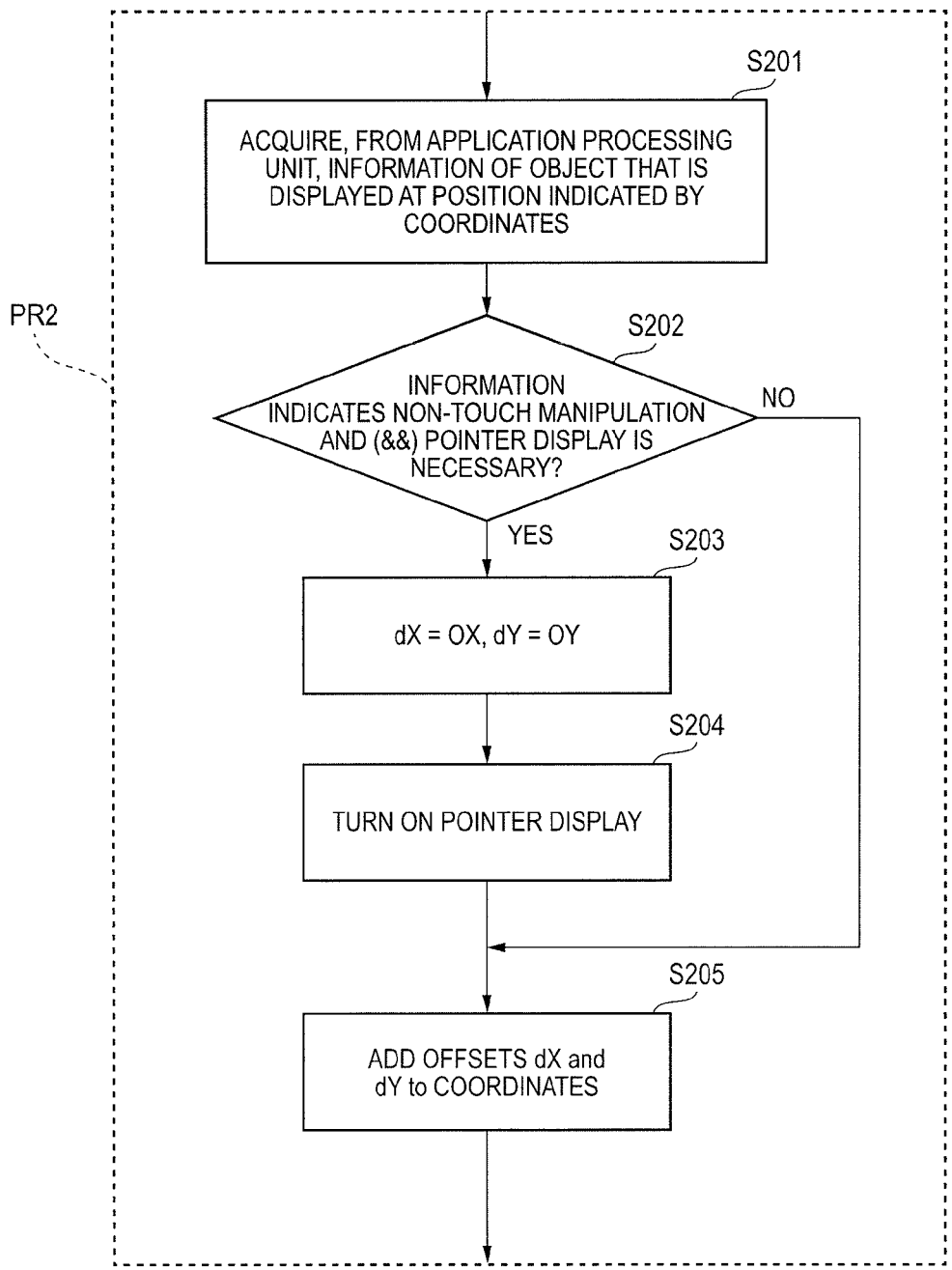
FIG. 12 is a flowchart showing how the 3D touch panel device according to a third embodiment operates.

FIG. 12 is a flowchart showing how the 3D touch panel device 1 according to the third embodiment operates. Like the step group PR1 shown in FIG. 11, a step group PR2 shown in FIG. 12 describes a display control for a pointer PT and is executed by the pointer coordinates control unit 11 of the control unit 10. In this embodiment, step S201 shown in FIG. 12 is executed after execution of steps S11-S15 shown in FIG. 11 and step S20 and the steps following it shown in FIG. 11 are executed after execution of step S205 shown in FIG. 12. In each of this and following embodiments, descriptions of steps S11-S15 and step S20 and the steps following it which are shown in FIG. 11 will be omitted.

In the step group PR2 which is executed after step S15 shown in FIG. 11, the pointer coordinates control unit 11 outputs, to the application processing unit 13, the information of the two-dimensional coordinates (x,y) on the proximity touch panel 50 corresponding to the three-dimensional coordinates (x,y,z) that has been acquired from the position detection unit 30 and indicates the finger position (S201). The application processing unit 13 judges information of an object that is displayed in a display region located at the position of the two-dimensional coordinates (x,y) that are output from the pointer coordinates control unit 11, and outputs a judgment result to the pointer coordinates control unit 11 (S201).

The pointer coordinates control unit 11 judges whether a touch manipulation is not being performed and display of a pointer PT is necessary on the basis of the information of the object (e.g., button, menu, or icon) that is output from the application processing unit 13 and the manipulation state information acquired at step S15 (S202). For example, the pointer coordinates control unit 11 judges whether or not the manipulation state information acquired at step S15 is information indicating a non-touch manipulation, and compares the size of the object displayed in the display region of the two-dimensional coordinates (x,y) on the manipulation surface of the proximity touch panel 50 corresponding to the position of the finger UF being hover-manipulated with a prescribed threshold value. The pointer coordinates control unit 11 judges that display of a pointer PT is not necessary if the manipulation state information is not information indicating a non-touch manipulation or the object is a large one whose size exceeds the prescribed threshold value. The pointer coordinates control unit 11 judges that display of a pointer PT is necessary if the manipulation state information is information indicating a non-touch manipulation and the object is a small one whose size does not exceed the prescribed threshold value.

Even if the manipulation state information acquired at step S15 is information indicating a non-touch manipulation, if a document content written in HTML is displayed on the display screen of the display unit 40, the pointer coordinates control unit 11 judges whether display of a pointer PT is necessary or not according to the kind or size of an object, such as an image, a button, or a link, buried in each region of the content. For example, even if the manipulation state information acquired at step S15 is information indicating a non-touch manipulation, the pointer coordinates control unit 11 judges that display of a pointer PT is not necessary if the position of the two-dimensional coordinates (x, y) on the proximity touch panel 50 corresponding to the finger UF being hover-manipulated is located inside a large size image or button of the content. And the pointer coordinates control unit 11 judges that display of a pointer PT is necessary if the manipulation state information acquired at step S15 is information indicating a non-touch manipulation and the position of the two-dimensional coordinates (x,y) is in the vicinity of a region where a small size link is displayed.

If the manipulation state information is information indicating a non-touch manipulation and it is judged resultantly that display of a pointer PT is necessary (S202: yes), the process of the pointer coordinates control unit 11 moves to step S203. If the manipulation state information is not information indicating a non-touch manipulation and it is judged resultantly that display of a pointer PT is not necessary (S202: no), the process of the pointer coordinates control unit 11 moves to step S205.

At step S203, the pointer coordinates control unit 11 substitutes predetermined constants OX and OY into the parameters dX and dY as offsets for a display position of a pointer PT, respectively (S203).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S203 (S204). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S203 (S204).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S203 to the two-dimensional coordinates (x,y) on the proximity touch panel 50 corresponding to the three-dimensional coordinates (x,y,z) detected at step S11 as indicating the position of the finger UF (S205).

If it is judged at step S202 that display of a pointer PT is not necessary, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y,z) of the finger UF detected at step S11 (S205).

As is understood from the above description, in the 3D touch panel device 1 according to the third embodiment, whether to display a pointer PT for a region being pointed by a user finger UF can be switched dynamically by executing the step group PR2 shown in FIG. 12. That is, it is possible to abstain from displaying a pointer PT in a case that a user would want to make an intuitive manipulation with a finger UF without using a pointer PT as in a case of manipulating a large object whose size exceeds the prescribed threshold value. It is also possible to display a pointer PT in a case that a user would require a pointer PT as in a case of manipulating a small object whose size is smaller the prescribed threshold value. In the 3D touch panel device 1 according to this embodiment, unlike in the second embodiment, it is not necessary to wait until lapse of the prescribed time T1 for the purpose of judging whether to display a pointer. Thus, a pointer PT can be displayed quickly.

<Embodiment 4>

Figure 13:
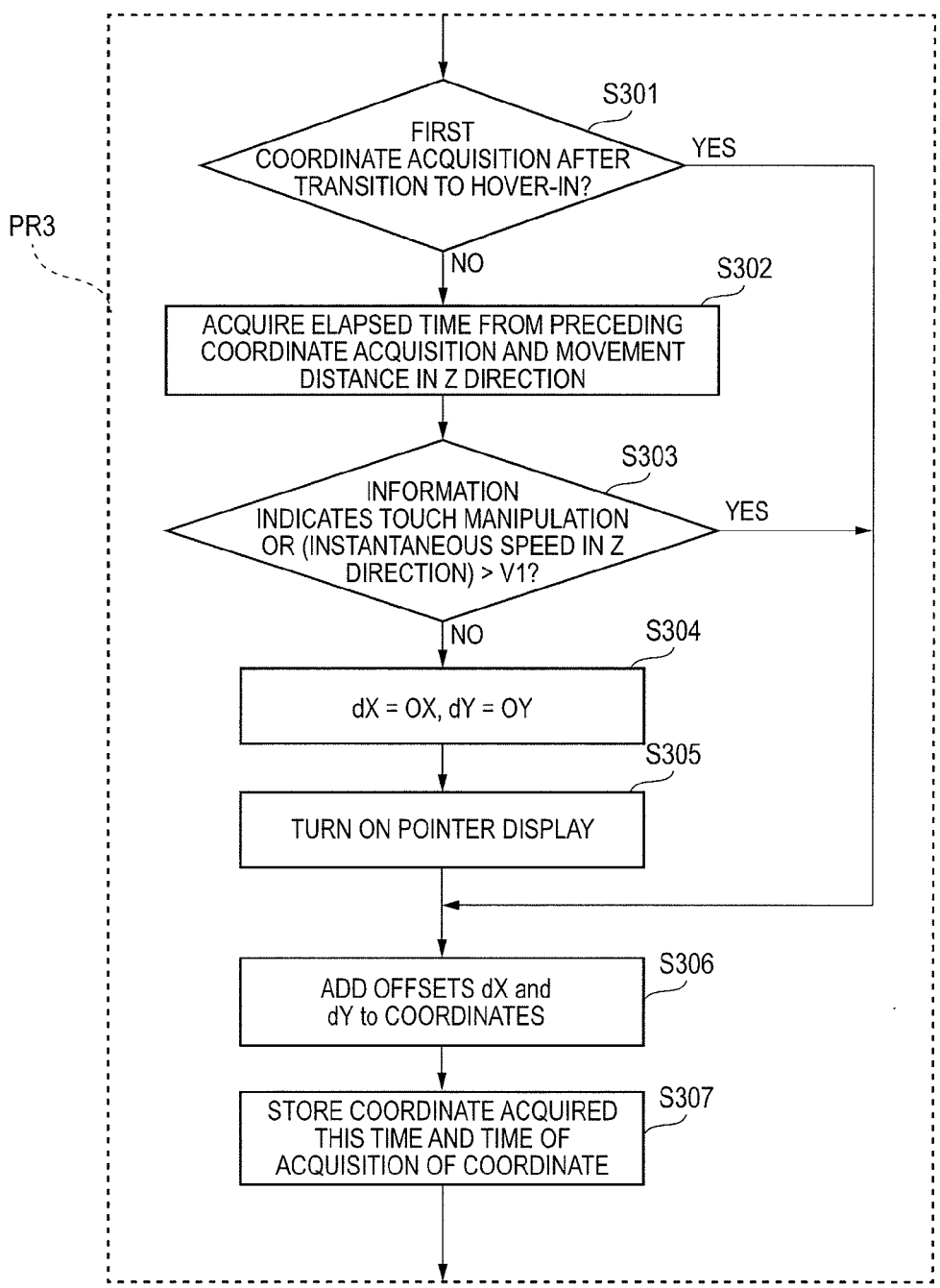
FIG. 13 is a flowchart showing how the 3D touch panel device according to a fourth embodiment operates.

FIG. 13 is a flowchart showing how the 3D touch panel device 1 according to the fourth embodiment operates. Like the step group PR1 shown in FIG. 11, a step group PR3 shown in FIG. 13 describes a display control for a pointer PT and is executed by the pointer coordinates control unit 11 of the control unit 10. In this embodiment, step S301 shown in FIG. 13 is executed after execution of steps S11-S15 shown in FIG. 11 and step S20 and the steps following it shown in FIG. 11 are executed after execution of step S307 shown in FIG. 13.

In the step group PR3 which is executed after step S15 shown in FIG. 11, the pointer coordinates control unit 11 judges whether or not this is the first time a z coordinate is acquired from the position detection unit 30 after the transition from the hover-out state to the hover-in state (S301). That is, the pointer coordinates control unit 11 judges whether or not past coordinate data exists which is necessary for calculation of a movement speed (approach speed) of the finger UF in the z direction. If this is the first time a z coordinate is acquired, the process of the pointer coordinates control unit 11 moves to step S306 because an approach speed in the z direction cannot be calculated. If this is the second or later time a z coordinate is acquired, the process of the pointer coordinates control unit 11 moves to step S302.

At step S302, the pointer coordinates control unit 11 acquires an elapsed time from preceding acquisition of a z coordinate to the present time and a movement distance in the z direction (a change in z coordinate) (S302). Furthermore, the pointer coordinates control unit 11 judges whether or not the manipulation state information acquired at step S15 is information indicating a touch manipulation on the basis of the manipulation state information acquired at step S15 and the elapsed time and the movement distance in the z direction acquired at step S302. And the pointer coordinates control unit 11 calculates an instantaneous movement speed of this time, that is, a quotient of the movement distance divided by the elapsed time (both acquired at step S302). It is assumed here that the movement distance and the movement speed are positive when the finger UF is moved in such a direction (negative z-axis direction) as to come closer to the manipulation surface of the proximity touch panel 50 (display screen), and that they are negative when the finger UF is moved in such a direction (positive z-axis direction) as to go away from the manipulation surface of the proximity touch panel 50 (display screen). Still further, the pointer coordinates control unit 11 compares the instantaneous movement speed in the z direction obtained at step S302 with a predetermined speed threshold value V1 (S303).

The process of the pointer coordinates control unit 11 moves to step S306 if the manipulation state information is information indicating a touch manipulation or the instantaneous movement speed is higher than the speed threshold value V1. The process of the pointer coordinates control unit 11 moves to step S304 if the manipulation state information is information indicating a non-touch manipulation and the instantaneous movement speed is lower than or equal to the speed threshold value V1.

At step S304, the pointer coordinates control unit 11 substitutes predetermined constants OX and OY into the parameters dX and dY as offsets for a display position of a pointer PT, respectively (S304).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S304 (S305). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S304 (S305).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S304 to the two-dimensional coordinates (x,y) on the proximity touch panel 50 corresponding to the three-dimensional coordinates (x,y,z) detected at step S11 as indicating the position of the finger UF (S306).

If it is judged at step S301 that this is the first time a z coordinate is acquired, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y, z) of the finger UF detected at step S11 (S306).

So that the coordinate acquired this time from the position detection unit 30 and the time of acquisition of this coordinate will be used at step S303 and the steps following it in the next loop, the pointer coordinates control unit 11 stores these pieces of information in a memory (not shown in FIG. 8) that is incorporated in the 3D touch panel device 1 (S307).

As is understood from the above description, in the 3D touch panel device 1 according to this embodiment, it is possible to judge whether to display a pointer PT in a simplified manner on the basis of the magnitude of an actual movement (approach speed) of a user finger UF by executing the step group PR3 shown in FIG. 13. That is, in a situation that a user wants to make an intuitive manipulation by directly touching a large size button or the like, it is highly probable that the user quickly brings a finger closer to the display screen. In this case, the instantaneous movement speed in the z direction should be higher than the speed threshold value V1 and hence the 3D touch panel device 1 can abstain from displaying a pointer PT. In this case, since there is no influence of offsets, an input manipulation can be made at a position touched by a user finger UF.

On the other hand, in a situation that a user wants to manipulate a button that is so small as to be hidden and rendered unseen by a finger, for example, a user would move a finger UF carefully. It is therefore highly probable that the user brings a finger UF closer to the display screen relatively slowly. In this case, the instantaneous movement speed in the z direction should be lower than or equal to the threshold value V1 and hence the 3D touch panel device 1 can display a pointer PT at a position that is deviated by offsets. Therefore, the user can make an input manipulation easily with accurate positioning while visually recognizing a manipulation position using the pointer PT that is displayed at the position that is a little deviated from the position of the finger UF.

<Embodiment 5>

Figure 14:
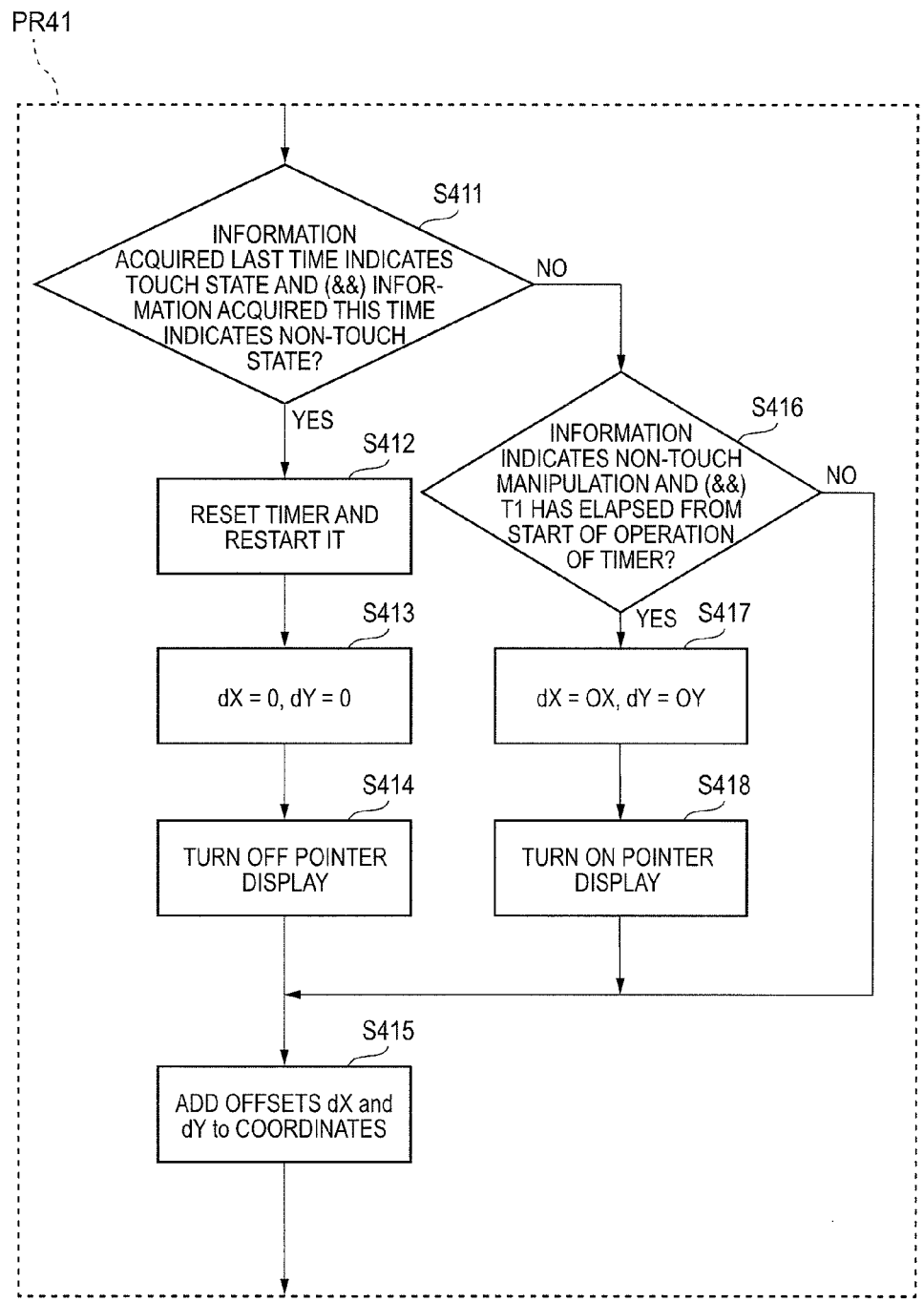
FIG. 14 is a flowchart showing how the 3D touch panel device according to a fifth embodiment operates.

FIG. 14 is a flowchart showing how the 3D touch panel device 1 according to the fifth embodiment operates. Like the step group PR1 shown in FIG. 11, a step group PR41 shown in FIG. 14 describes a display control for a pointer PT and is executed by the pointer coordinates control unit 11 of the control unit 10. In this embodiment, step S411 shown in FIG. 14 is executed after execution of steps S11-S15 shown in FIG. 11 and step S20 and the steps following it shown in FIG. 11 are executed after execution of step S415 shown in FIG. 14.

In the step group PR41 which is executed after step S15 shown in FIG. 11, the pointer coordinates control unit 11 judges whether or not the user has made a manipulation of releasing the finger UF from the display screen after touching it (S411). That is, based on pieces of information of three-dimensional coordinates (x,y,z) of the finger UF acquired from the position detection unit 30, the pointer coordinates control unit 11 judges whether or not information acquired last time indicates a touch state ((z coordinate)=0) and information acquired this time indicates a non-touch state ((z coordinate)≠0) (S411).

The symbol "&&" used in step S411 means the logical addition (AND) (this also applies to the embodiments described below). The process of the pointer coordinates control unit 11 moves to step S412 if a transition has occurred in the z coordinate of the three-dimensional coordinates of the finger UF acquired by the proximity touch panel 50 from "0" (last time; touch state) to a non-zero value (this time; non-touch state) (S411: yes). The process of the pointer coordinates control unit 11 moves to step S416 if a transition has not occurred in the z coordinate of the three-dimensional coordinates of the finger UF acquired by the proximity touch panel 50 from "0" (last time; touch state) to a non-zero value (this time; non-touch state) (S411: no).

At step S412, the pointer coordinates control unit 11 resets the counter which started the time measurement operation at step S14 shown in FIG. 11 and controls the timer to restart a time measurement operation (S412).

The pointer coordinates control unit 11 cancels the offsets for the display position of the pointer PT. More specifically, the pointer coordinates control unit 11 substitutes "0" into the parameters dX and dY (S413).

The pointer coordinates control unit 11 controls the pointer display control unit 15 not to display a pointer PT (S414).

On the other hand, at step S416, the pointer coordinates control unit 11 judges whether or not the manipulation state information acquired at step S15 is information indicating a non-touch manipulation and a prescribed time T1 has elapsed from the start (made at step S14) of the time measurement operation of the timer (S416). If the manipulation state information is information indicating a non-touch manipulation and the prescribed time T1 has elapsed (S416: yes), the pointer coordinates control unit 11 judges that a pointer PT should be displayed. After the making of this judgment, the process of the pointer coordinates control unit 11 then moves to step S417.

On the other hand, if the manipulation state information is not information indicating a non-touch manipulation, that is, information indicating a touch manipulation or the prescribed time T1 has elapsed yet (S416: no), the pointer coordinates control unit 11 judges that a pointer PT should not be displayed. After the making of this judgment, the process of the pointer coordinates control unit 11 moves to step S415.

At step S417, the pointer coordinates control unit 11 substitutes predetermined constants OX and OY into the parameters dX and dY as offsets for a display position of a pointer PT, respectively (S417).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S417 (S418). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S417 (S418).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S417 to the two-dimensional coordinates (x,y) on the proximity touch panel 50 corresponding to the three-dimensional coordinates (x,y,z) detected at step S11 as indicating the position of the finger UF (S415).

If it is judged at step S416 that the prescribed time T1 has not elapsed yet, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y, z) of the finger UF detected at step S11 (S415).

When a user attempts to manipulate one of various objects on the screen, an example situation is supposed; the user manipulates another, relatively large button after manipulating a relatively small button. Therefore, where the 3D touch panel device 1 executes the step group PR1 shown in FIG. 11, a pointer PT is displayed when the user manipulates a small button and the pointer PT continues to be displayed unless the user moves the finger to the hover-out position. As a result, when the user manipulates a large button next as part of a series of successive manipulations, influence of the offsets appears to hinder the user from making an intended intuitive manipulation.

As described above, by executing the step group PR41 shown in FIG. 14, the 3D touch panel device 1 according to this embodiment displays a pointer PT when a user manipulates a small button. If the user touches the screen with a finger and releases the touch immediately thereafter, at step S414 the 3D touch panel device 1 turns off display of a pointer PT temporarily to eliminate influence of the offsets. When the user manipulates a large button soon after the manipulation of the small button, the 3D touch panel device 1 allows the user to make an intuitive input manipulation (e.g., direct touching of a target button) easily without being affected by offsets.

Furthermore, in the 3D touch panel device 1, the condition for judging whether to display a pointer PT which is employed in the second embodiment is combined with the specific feature of this embodiment that display of a pointer PT is turned off after release of a touch. Therefore, switching between display and non-display of a pointer PT can be made in a simplified manner depending on whether or not a user finger UF is kept in a proximity state for more than the prescribed time T1.

<Embodiment 6>

Figure 15:
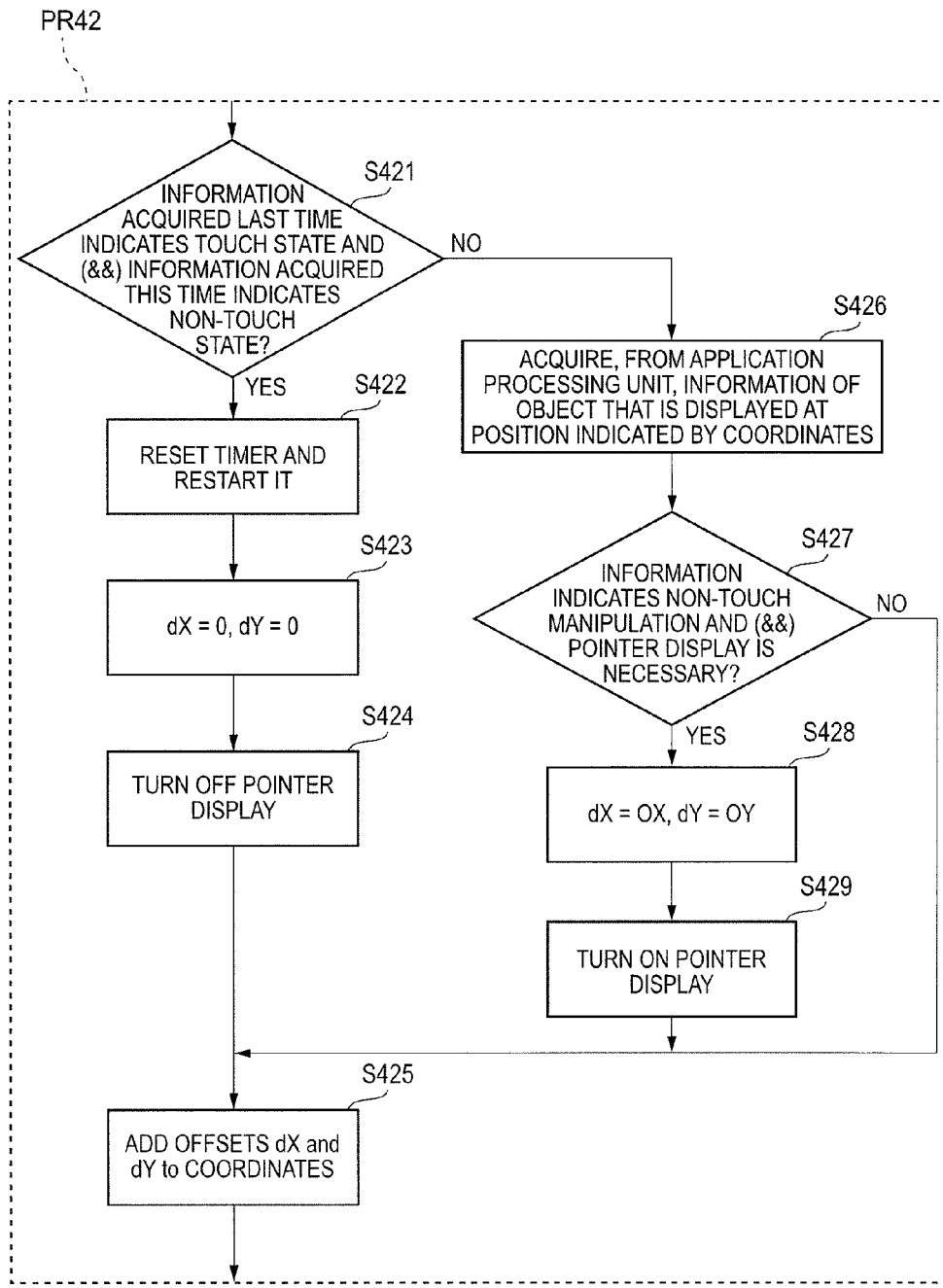
FIG. 15 is a flowchart showing how the 3D touch panel device according to a sixth embodiment operates.

FIG. 15 is a flowchart showing how the 3D touch panel device 1 according to the sixth embodiment operates. Like the step group PR1 shown in FIG. 11, a step group PR42 shown in FIG. 15 describes a display control for a pointer PT and is executed by the pointer coordinates control unit 11 of the control unit 10. In this embodiment, step S421 shown in FIG. 15 is executed after execution of steps S11-S15 shown in FIG. 11 and step S20 and the steps following it shown in FIG. 11 are executed after execution of step S425 shown in FIG. 15.

In the step group PR42 which is executed after step S15 shown in FIG. 11, the pointer coordinates control unit 11 judges whether or not the user has made a manipulation of releasing the finger UF from the display screen after touching it (S421). That is, based on pieces of information of three-dimensional coordinates (x,y,z) of the finger UF acquired from the position detection unit 30, the pointer coordinates control unit 11 judges whether or not information acquired last time indicates a touch state ((z coordinate)=0) and information acquired this time indicates a non-touch state ((z coordinate)≠0) (S421).

The process of the pointer coordinates control unit 11 moves to step S422 if a transition has occurred in the z coordinate of the three-dimensional coordinates of the finger UF acquired by the proximity touch panel 50 from "0" (last time; touch state) to a non-zero value (this time; non-touch state) (S421: yes). The process of the pointer coordinates control unit 11 moves to step S426 if a transition has not occurred in the z coordinate of the three-dimensional coordinates of the finger UF acquired by the proximity touch panel 50 from "0" (last time; touch state) to a non-zero value (this time; non-touch state) (S421: no).

At step S422, the pointer coordinates control unit 11 resets the counter which started the time measurement operation at step S14 shown in FIG. 11 and controls the timer to restart a time measurement operation (S422).

The pointer coordinates control unit 11 cancels the offsets for the display position of the pointer PT. More specifically, the pointer coordinates control unit 11 substitutes "0" into the parameters dX and dY (S423).

The pointer coordinates control unit 11 controls the pointer display control unit 15 not to display a pointer PT (S424).

On the other hand, at step S426, the pointer coordinates control unit 11 outputs, to the application processing unit 13, the information of the two-dimensional coordinates (x,y) on the proximity touch panel 50 corresponding to the three-dimensional coordinates (x,y,z) that has been acquired from the position detection unit 30 and indicates the finger position (S426). The application processing unit 13 judges information of an object that is displayed in a display region located at the position of the two-dimensional coordinates (x,y) that are output from the pointer coordinates control unit 11, and outputs a judgment result to the pointer coordinates control unit 11 (S426).

The pointer coordinates control unit 11 judges whether a touch manipulation is not being performed and display of a pointer PT is necessary on the basis of the information acquired from the application processing unit 13 and the manipulation state information acquired at step S15 (S427). Step S427 will not be described in detail because it is the same as step S202 shown in FIG. 12.

If the manipulation state information is information indicating a non-touch manipulation and it is judged resultantly that display of a pointer PT is necessary (S427: yes), the process of the pointer coordinates control unit 11 moves to step S428. If the manipulation state information is not information indicating a non-touch manipulation and it is judged resultantly that display of a pointer PT is not necessary (S427: no), the process of the pointer coordinates control unit 11 moves to step S425.

At step S428, the pointer coordinates control unit 11 substitutes predetermined constants OX and OY into the parameters dX and dY as offsets for a display position of a pointer PT, respectively (S428).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S428 (S429). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S428 (S429).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S428 to the two-dimensional coordinates (x,y) on the proximity touch panel 50 corresponding to the three-dimensional coordinates (x,y,z) detected at step S11 as indicating the position of the finger UF (S425).

If it is judged at step S427 that display of a pointer PT is not necessary, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y,z) of the finger UF detected at step S11 (S425).

As is understood from the above description, in the 3D touch panel device 1 according to this embodiment, by executing the step group PR42 shown in FIG. 15, switching can be made temporarily in a simplified manner to non-display of a pointer PT if a user cancels a touch state by releasing a finger from the display screen after a pointer PT was displayed, as in the case that the step group PR41 shown in FIG. 14 is executed.

Furthermore, in the 3D touch panel device 1, the condition for judging whether to display a pointer PT which is employed in the third embodiment is combined with the specific feature of this embodiment that display of a pointer PT is turned off after release of a touch. Therefore, switching as to whether to display a pointer PT in a region currently pointed by a user finger UF can be made dynamically.

<Embodiment 7>

Figure 16:
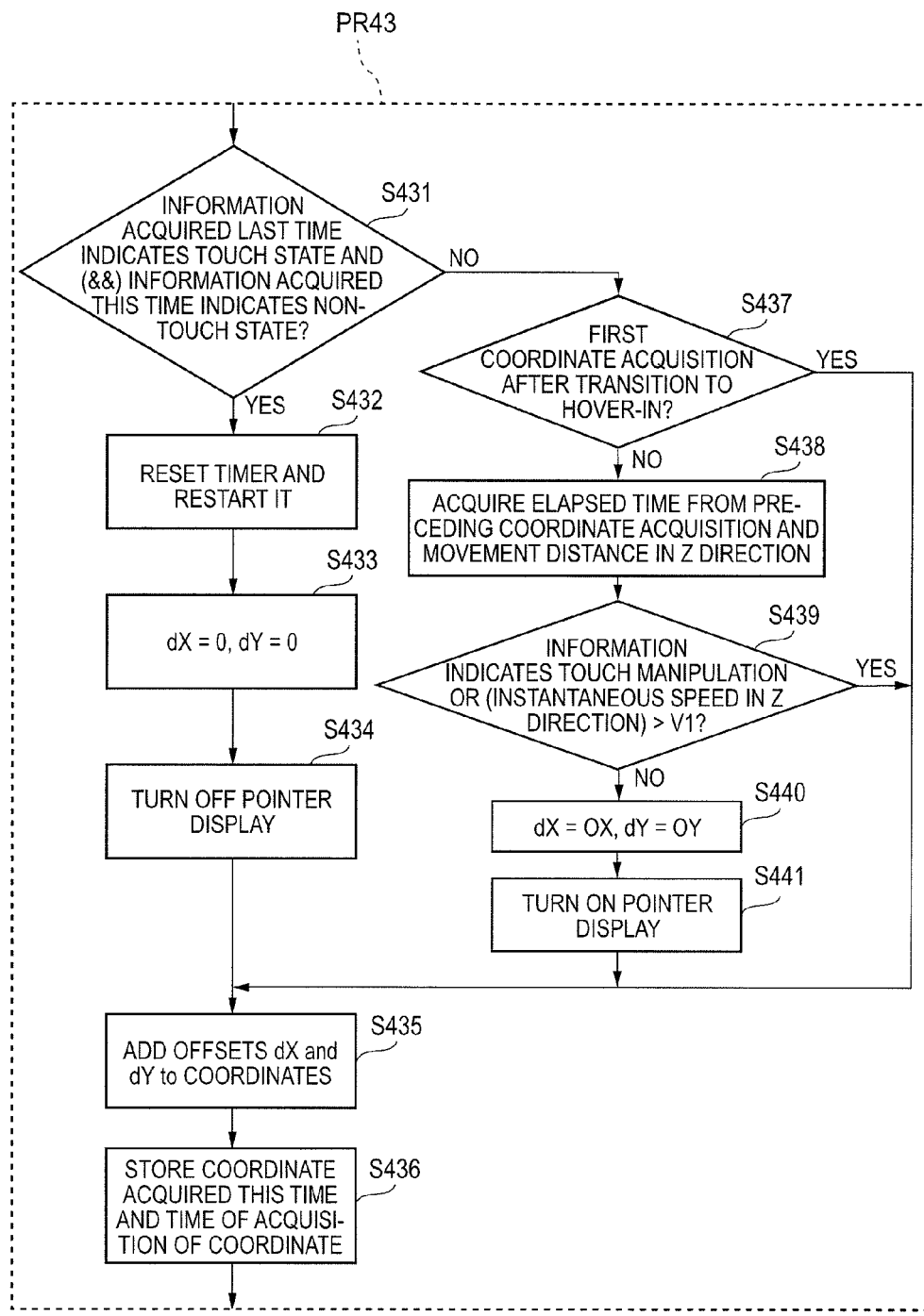
FIG. 16 is a flowchart showing how the 3D touch panel device according to a seventh embodiment operates.

FIG. 16 is a flowchart showing how the 3D touch panel device 1 according to the seventh embodiment operates. Like the step group PR1 shown in FIG. 11, a step group PR43 shown in FIG. 16 describes a display control for a pointer PT and is executed by the pointer coordinates control unit 11 of the control unit 10. In this embodiment, step S431 shown in FIG. 16 is executed after execution of steps S11-S15 shown in FIG. 11 and step S20 and the steps following it shown in FIG. 11 are executed after execution of step S436 shown in FIG. 16.

In the step group PR43 which is executed after step S15 shown in FIG. 11, the pointer coordinates control unit 11 judges whether or not the user has made a manipulation of releasing the finger UF from the display screen after touching it (S431). That is, based on pieces of information of three-dimensional coordinates (x,y,z) of the finger UF acquired from the position detection unit 30, the pointer coordinates control unit 11 judges whether or not information acquired last time indicates a touch state ((z coordinate)=0) and information acquired this time indicates a non-touch state ((z coordinate)≠0) (S431).

The process of the pointer coordinates control unit 11 moves to step S432 if a transition has occurred in the z coordinate of the three-dimensional coordinates of the finger UF acquired by the proximity touch panel 50 from "0" (last time; touch state) to a non-zero value (this time; non-touch state) (S431: yes). The process of the pointer coordinates control unit 11 moves to step S437 if a transition has not occurred in the z coordinate of the three-dimensional coordinates of the finger UF acquired by the proximity touch panel 50 from "0" (last time; touch state) to a non-zero value (this time; non-touch state) (S431: no).

At step S432, the pointer coordinates control unit 11 resets the counter which started the time measurement operation at step S14 shown in FIG. 11 and controls the timer to restart a time measurement operation (S432).

The pointer coordinates control unit 11 cancels the offsets for the display position of the pointer PT. More specifically, the pointer coordinates control unit 11 substitutes "0" into the parameters dX and dY (S433).

The pointer coordinates control unit 11 controls the pointer display control unit 15 not to display a pointer PT (S434).

On the other hand, at step S437, the pointer coordinates control unit 11 judges whether or not this is the first time a z coordinate is acquired from the position detection unit 30 after the transition from the hover-out state to the hover-in state (S437). That is, the pointer coordinates control unit 11 judges whether or not past coordinate data exists which is necessary for calculation of a movement speed (approach speed) of the finger UF in the z direction. If this is the first time a z coordinate is acquired, the process of the pointer coordinates control unit 11 moves to step S435 because an approach speed in the z direction cannot be calculated. If this is the second or later time a z coordinate is acquired, the process of the pointer coordinates control unit 11 moves to step S438.

At step S438, the pointer coordinates control unit 11 acquires an elapsed time from preceding acquisition of a z coordinate to the present time and a movement distance in the z direction (a change in z coordinate) (S438). Furthermore, the pointer coordinates control unit 11 judges whether or not the manipulation state information acquired at step S15 is information indicating a touch manipulation on the basis of the manipulation state information acquired at step S15 and the elapsed time and the movement distance in the z direction acquired at step S438. And the pointer coordinates control unit 11 calculates an instantaneous movement speed of this time, that is, a quotient of the movement distance divided by the elapsed time (both acquired at step S438). It is assumed here that the movement distance and the movement speed are positive when the finger UF is moved in such a direction (negative z-axis direction) as to come closer to the manipulation surface of the proximity touch panel 50 (display screen), and that they are negative when the finger UF is moved in such a direction (positive z-axis direction) as to go away from the manipulation surface of the proximity touch panel 50 (display screen). Still further, the pointer coordinates control unit 11 compares the instantaneous movement speed in the z direction obtained at step S438 with a predetermined speed threshold value V1 (S439).

The process of the pointer coordinates control unit 11 moves to step S435 if the manipulation state information is information indicating a touch manipulation or the instantaneous movement speed is higher than the speed threshold value V1. The process of the pointer coordinates control unit 11 moves to step S440 if the manipulation state information is information indicating a non-touch manipulation and the instantaneous movement speed is lower than or equal to the speed threshold value V1.

At step S440, the pointer coordinates control unit 11 substitutes predetermined constants OX and OY into the parameters dX and dY as offsets for a display position of a pointer PT, respectively (S440).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S304 (S441). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S440 (S441).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S440 to the two-dimensional coordinates (x,y) on the proximity touch panel 50 corresponding to the three-dimensional coordinates (x,y,z) detected at step S11 as indicating the position of the finger UF (S435).

If it is judged at step S437 that this is the first time a z coordinate is acquired, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y, z) of the finger UF detected at step S11 (S435).

So that the coordinate acquired this time from the position detection unit 30 and the time of acquisition of this coordinate will be used at step S439 and the steps following it in the next loop, the pointer coordinates control unit 11 stores these pieces of information in a memory (not shown in FIG. 8) that is incorporated in the 3D touch panel device 1 (S436).

As is understood from the above description, in the 3D touch panel device 1 according to this embodiment, by executing the step group PR43 shown in FIG. 16, switching can be made temporarily in a simplified manner to non-display of a pointer PT if a user cancels a touch state by releasing a finger from the display screen after a pointer PT was displayed, as in the case that the step group PR41 shown in FIG. 14 is executed.

Furthermore, in the 3D touch panel device 1, the condition for judging whether to display a pointer PT which is employed in the fourth embodiment is combined with the specific feature of this embodiment that display of a pointer PT is turned off after release of a touch. Therefore, switching as to whether to display a pointer PT can be made in a simplified manner on the basis of the magnitude of a movement (approach speed) of a user finger UF.

<Embodiment 8>

Figure 17:
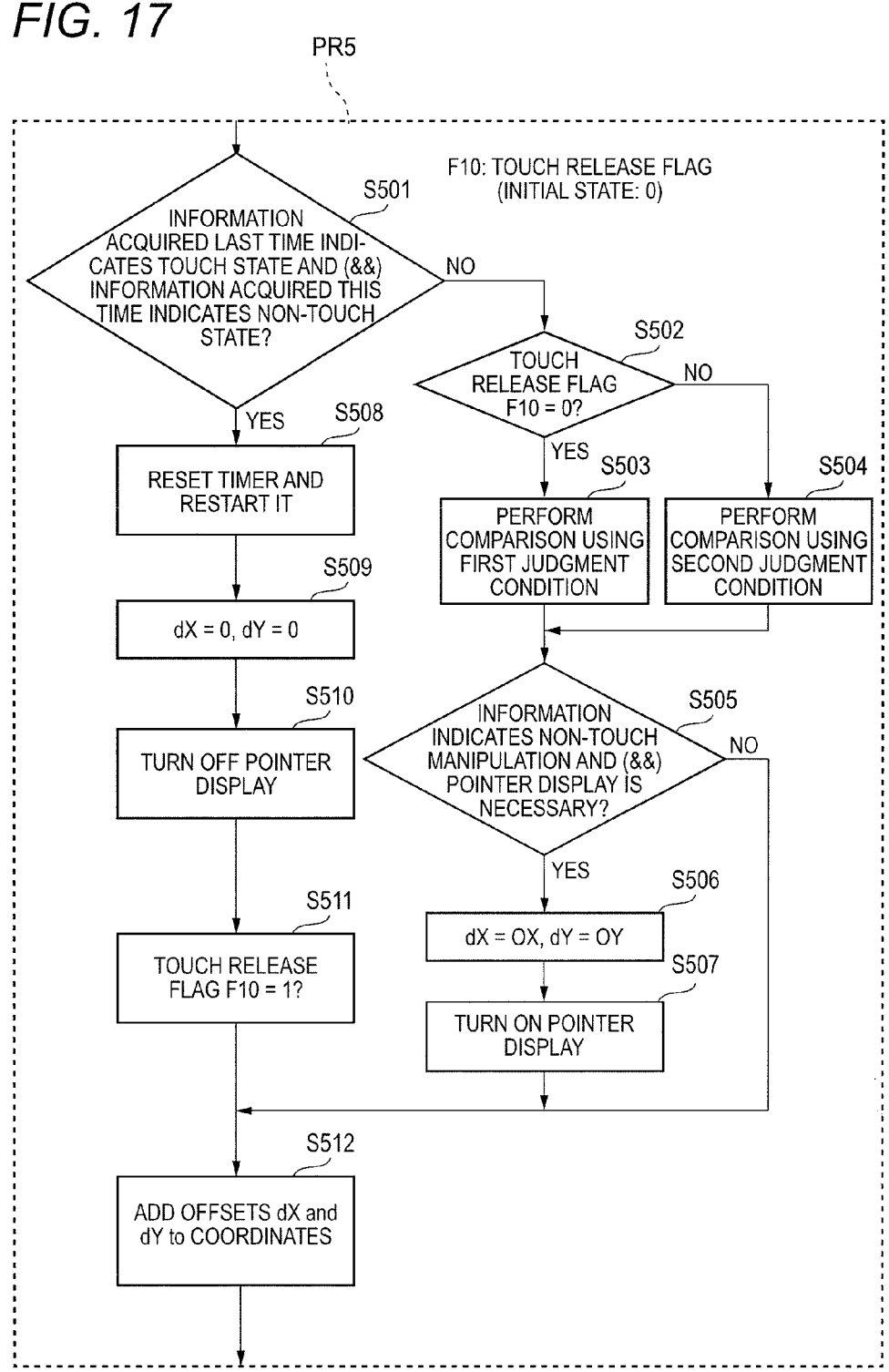
FIG. 17 is a flowchart showing how the 3D touch panel device according to an eighth embodiment operates.

FIG. 17 is a flowchart showing how the 3D touch panel device 1 according to the eighth embodiment operates. Like the step group PR1 shown in FIG. 11, a step group PR5 shown in FIG. 17 describes a display control for a pointer PT and is executed by the pointer coordinates control unit 11 of the control unit 10. In this embodiment, step S501 shown in FIG. 17 is executed after execution of steps S11-S15 shown in FIG. 11 and step S20 and the steps following it shown in FIG. 11 are executed after execution of step S512 shown in FIG. 17.

In the step group PR5 which is executed after step S15 shown in FIG. 11, the pointer coordinates control unit 11 judges whether or not the user has made a manipulation of releasing the finger UF from the display screen after touching it (S501). That is, based on pieces of information of three-dimensional coordinates (x,y,z) of the finger UF acquired from the position detection unit 30, the pointer coordinates control unit 11 judges whether or not information acquired last time indicates a touch state ((z coordinate)=0) and information acquired this time indicates a non-touch state ((z coordinate)≠0) (S501).

The process of the pointer coordinates control unit 11 moves to step S508 if a transition has occurred in the z coordinate of the three-dimensional coordinates of the finger UF acquired by the proximity touch panel 50 from "0" (last time; touch state) to a non-zero value (this time; non-touch state) (S501: yes). The process of the pointer coordinates control unit 11 moves to step S502 if a transition has not occurred in the z coordinate of the three-dimensional coordinates of the finger UF acquired by the proximity touch panel 50 from "0" (last time; touch state) to a non-zero value (this time; non-touch state) (S501: no).

At step S508, the pointer coordinates control unit 11 resets the counter which started the time measurement operation at step S14 shown in FIG. 11 and controls the timer to restart a time measurement operation (S508).

The pointer coordinates control unit 11 cancels the offsets for the display position of the pointer PT. More specifically, the pointer coordinates control unit 11 substitutes "0" into the parameters dX and dY (S509).

The pointer coordinates control unit 11 controls the pointer display control unit 15 not to display a pointer PT (S510) and sets a touch release flag F10 to "1" (S511). It is assumed that the touch release flag F10 is set at "0" in the initial state of the process of the flowchart of FIG. 17.

On the other hand, at step S502, the pointer coordinates control unit 11 judges whether or not the touch release flag F10 is equal to "0" (S502). The process of the pointer coordinates control unit 11 moves to step S503 if the touch release flag F10 is equal to "0" (initial value), and to step S504 if the touch release flag F10 is equal to "1."

The pointer coordinates control unit 11 performs comparison processing relating to whether to display a pointer PT according to a predetermined first judgment condition (S503). The pointer coordinates control unit 11 performs comparison processing relating to whether to display a pointer PT according to a predetermined second judgment condition (S504).

As for specific examples, the judgment condition of step S16 shown in FIG. 11, that is, whether to display a pointer PT is judged according to whether or not the prescribed time T1 has elapsed from the start (made at step S14) of the time measurement operation of the timer, is employed as the first judgment condition. In this embodiment, it is assumed that the first judgment condition is predetermined in the process of the pointer coordinates control unit 11.

The condition of steps S201 and S202 shown in FIG. 12, that is, whether to display a pointer PT is judged on the basis of pieces of information, output from the application processing unit 13, of objects (e.g., buttons, menus, or icons) in respective display regions on the display screen of the display unit 40, is employed as the second judgment condition. In this embodiment, it is assumed that the second judgment condition is predetermined in the process of the pointer coordinates control unit 11.

The above-described first judgment condition and second judgment condition are just examples. For example, at both of steps S503 and 3504, the pointer coordinates control unit 11 may judge whether to display a pointer PT according to the judgment condition of step S16 shown in FIG. 11 in such a manner that the prescribed times T1 of the judgment conditions of steps S503 and S504 are set at 0.5 s and 1 s, respectively.

At step S505, the pointer coordinates control unit 11 judges whether a touch manipulation is not being performed and display of a pointer PT is necessary on the basis of the result of the judgment made at step S503 or S504 and the manipulation state information acquired at step S15 (S505). The process of the pointer coordinates control unit 11 moves to step S506 if the manipulation state information is information indicating a non-touch manipulation and it is judged resultantly according to the first judgment condition of step S503 or the second judgment condition of step S504 that display of a pointer PT is necessary. The process of the pointer coordinates control unit 11 moves to step S512 if the manipulation state information is not information indicating a non-touch manipulation and it is judged resultantly that display of a pointer PT is not necessary.

At step S506, the pointer coordinates control unit 11 substitutes predetermined constants OX and OY into the parameters dX and dY as offsets for a display position of a pointer PT, respectively (S506).

The pointer coordinates control unit 11 outputs, to the pointer display control unit 15, an instruction to display a pointer PT at a position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S506 (S507). This instruction includes information of the offsets (dX, dY).

According to the instruction that is output from the pointer coordinates control unit 11, the pointer display control unit 15 displays a pointer PT at the position that is deviated from the position of the two-dimensional coordinates (x,y) on the proximity touch panel 50 corresponding to the three-dimensional coordinates (x,y,z) detected at step S11 as indicating the position of the finger UF by the offsets (dX, dY) that were substituted at step S428 (S507).

The pointer coordinates control unit 11 employs, as two-dimensional coordinates on the proximity touch panel 50 indicating a position of a user manipulation target among the objects displayed on the display screen, coordinates obtained by adding the offsets (dX, dY) substituted at step S506 to the two-dimensional coordinates (x,y) on the proximity touch panel 50 corresponding to the three-dimensional coordinates (x,y,z) detected at step S11 as indicating the position of the finger UF (S512).

If it is judged at step S505 that display of a pointer PT is not necessary, a pointer PT is not displayed but the initial offsets (dX, dY)=(0,0) that were set at step S12 are added to the two-dimensional coordinates (x,y) on the proximity touch panel 50 corresponding to the three-dimensional coordinates (x,y,z) of the finger UF detected at step S11 (S512).

As is understood from the above description, in the 3D touch panel device 1 according to this embodiment, since the condition for judging whether to display a pointer PT is switched according to the use situation of the 3D touch panel device 1 in the manner of steps S502-S504 shown in FIG. 17, display/non-display of a pointer PT can be controlled in a more proper and simplified manner. That is, the 3D touch panel device 1 can display a pointer PT quickly when a user needs display of a pointer PT, and can turn off display of a pointer PT quickly and thereby eliminate influence of offsets when a user does not need display of a pointer PT.

<Embodiment 9 >

Figure 18:
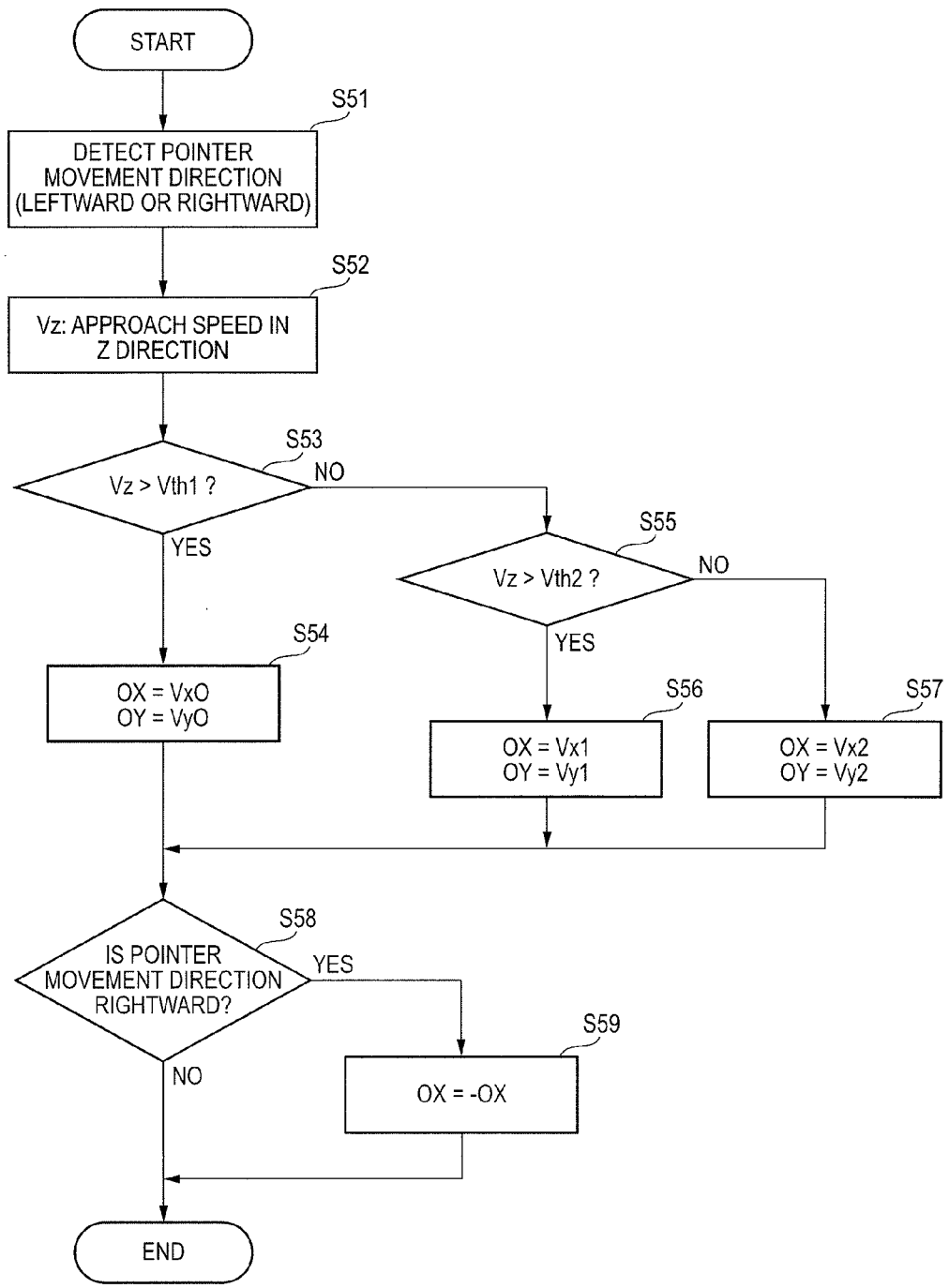
FIG. 18 is a flowchart showing how the 3D touch panel device according to a ninth embodiment operates.

FIG. 18 is a flowchart showing how the 3D touch panel device 1 according to the ninth embodiment operates. The steps shown in FIG. 18 are used in changing the offsets or the display position of a pointer PT mentioned above.

For example, the steps shown in FIG. 18 are executed by the pointer coordinates control unit 11 periodically in a short cycle. Therefore, the pointer coordinates control unit 11 can execute the process shown in FIG. 18 parallel with one of the processes shown in FIGS. 11-17. Whereas in each of the second to eighth embodiments both of the offset parameters OX and OY are a constant, in this embodiment the parameters OX and OY are variables. The process shown in FIG. 18 will be described below with an assumption that a pointer PT is displayed on the display screen of the display unit 40 as a result of execution of the process according to one of the second to eighth embodiments.

The pointer coordinates control unit 11 detects whether the pointer movement direction is leftward or rightward (in the X-axis direction) by monitoring variations of the two-dimensional coordinates (x,y) indicating the position on the proximity touch panel 50 corresponding to the three-dimensional coordinates (x,y, z) of a finger that are output from the position detection unit 30 (S51).

The pointer coordinates control unit 11 calculates a finger approach speed Vz in the z direction by monitoring a variation in the z direction of the three-dimensional coordinates (x,y,z) of the finger that are output from the position detection unit 30 and a time taken (S52).

The pointer coordinates control unit 11 compares the approach speed Vz obtained at step S52 with a predetermined speed threshold value Vth1 (S53). The process of the pointer coordinates control unit 11 moves to step S54 if the approach speed Vz is higher than the speed threshold value Vth1, and moves to step S55 if the approach speed Vz is lower than or equal to the speed threshold value Vth1.

The pointer coordinates control unit 11 compares the approach speed Vz obtained at step S52 with a predetermined speed threshold value Vth2 (S55). The process of the pointer coordinates control unit 11 moves to step S56 if the approach speed Vz is higher than the speed threshold value Vth2, and moves to step S57 if the approach speed Vz is lower than or equal to the speed threshold value Vth2.

At step S54, the pointer coordinates control unit 11 substitutes predetermined constants Vx0 and Vy0 into the variables OX and OY which represent position offsets in the x direction and the y direction, respectively (S54).

At step S56, the pointer coordinates control unit 11 substitutes predetermined constants Vx1 and Vy1 into the variables OX and OY which represent position offsets in the x direction and the y direction, respectively (S56).

At step S57, the pointer coordinates control unit 11 substitutes predetermined constants Vx2 and Vy2 into the variables OX and OY which represent position offsets in the x direction and the y direction, respectively (S57).

After executing step S54, S56, or S57, the pointer coordinates control unit 11 judges whether the movement diction of the pointer PT detected by step S51 is leftward or rightward (S58). The process of the pointer coordinates control unit 11 moves to step S59 if the movement diction of the pointer PT is rightward. The process shown in FIG. 18 is finished if the movement diction of the pointer PT is leftward.

At step S59, the pointer coordinates control unit 11 inverts the sign of the variable OX which represents the position offset in the x direction (S59). That is, the pointer coordinates control unit 11 corrects the two-dimensional coordinates (x,y) of the display position of the pointer PT which is already deviated by the offsets by changing the value of the variable OX to a negative value if it is a positive value and to a positive value if it is a negative value.

As described above, the offsets between a display position of a pointer PT and an spatial position of a finger UF being in a proximity state are determined by the variables OX and OY. Therefore, in the 3D touch panel device 1 according to this embodiment, the magnitude and the direction of the offset of the display position of a pointer PT can be changed according to a movement (approach speed) of a user finger UF by executing the process shown in FIG. 18. That is, one of the three sets of offsets can be selected according to the magnitude of an approach speed at which a user brings a finger UF closer to the display screen (proximity touch panel 50).

Furthermore, the 3D touch panel device 1 can display a pointer PT on the top-left of a user finger UF (see FIG. 9) when the finger UF is moving leftward on the display screen, and display a pointer PT on the top-right of a user finger UF by inverting the sign (+/−) of the offset when the finger UF is moving rightward.

<Other Modifications>

Although in each of the above embodiments a pointer PT is not displayed when a user does not need display of a pointer PT, the offsets for the display position of a pointer PT may be changed while the pointer PT is kept displayed. That is, if the offsets (dX, dY) are set to 0 so that the position of a finger UF is not deviated from the position of a user manipulation target on the display screen when the user does not need a pointer PT, no problems occur even if a pointer PT is kept displayed.

At step S11 shown in FIG. 11, it is detected whether or not the distance of an approach finger UF from the display screen has become shorter than or equal to the threshold value zth, that is, it is judged whether or not a transition has been made to a hover-in state. That is, a pointer PT display control is started being triggered by a transition to a hover-in state. However, whether to start a pointer PT display control may be judged using a threshold distance value that is different from the one of the condition for the judgment as to a transition to a hover-in state (shorter than or equal to the threshold value zth).

At step S21 shown in FIG. 11, it is detected whether or not the distance of an approach finger UF from the display screen has become longer than the threshold value zth, that is, it is judged whether or not a transition has been made to a hover-out state. A pointer PT display control is finished if the distance has exceeded the threshold value zth. However, whether to finish a pointer PT display control may be judged using a threshold distance value that is different from the one of the condition for the judgment as to a transition to a hover-out state (longer than the threshold value zth).

In FIG. 11, the pointer coordinates control unit 11 turns off the display of a pointer PT (S22) as soon as it is judged at step S21 that a transition to a hover-out state has been made. However, various modifications are possible for the timing of turning off of the display of a pointer PT. For example, the display of a pointer PT may be maintained until lapse of a prescribed time (e.g., 0.5 s) after a judgment that a transition to a hover-out state has been made. This also applies to the timing of turning off the display of a pointer PT at step S414 shown in FIG. 14.

In the step group PR3 shown in FIG. 13, at step S303 an approach speed in the z direction is compared with the speed threshold value V1. However, the pointer coordinates control unit 11 may make a judgment also taking into movement speeds in another direction into consideration. For example, a pointer PT may be displayed only if a movement speed in a direction that is parallel with the xy plane is lower than or equal to a prescribed value and a movement speed in the z direction lower than or equal to the prescribed value.

Furthermore, in the step group PR41 shown in FIG. 14, display of a pointer PT is turned off temporarily (S414) if it is detected at step S411 that a touch has been canceled (released). However, the pointer coordinates control unit 11 may turn off display of a pointer PT in response to a manipulation other than touch release. For example, the pointer coordinates control unit 11 may turn off display of a pointer PT temporarily when it is detected that a pop-up picture has been displayed on the screen under the control of an application, and display a pointer PT again when the condition of step S416 is satisfied. As a further alternative, the pointer coordinates control unit 11 may turn off display of a pointer PT temporarily when it is detected that the approach speed of a finger UF in the z direction (in the direction going away from the screen) has become higher than or equal to a prescribed speed in a state that a pointer PT is displayed and display a pointer PT again when the condition of step S303 (see FIG. 13) is satisfied.

Although the various embodiments have been described above with reference to the drawings, it goes without saying that the invention is not limited to those examples. It is apparent that those skilled in the art would conceive changes or modifications of the various embodiments or combinations of the various embodiments within the confines of the claims. And such changes, modifications, and combinations are naturally included in the technical scope of the invention.

The present application is based on Japanese Patent Application No. 2011-109344 filed on May 16, 2011, the disclosure of which is incorporated herein by reference.

INDUSTRIAL APPLICABILITY

The present invention is useful when applied to display devices, display control methods, and display control programs which allow a user to visually recognize information displayed on the screen easily while he or she is using a touch panel.

DESCRIPTION OF REFERENCE NUMERALS AND SIGNS

1: 3D touch panel device
10: Control unit
11: Pointer coordinates control unit
12: Direction judgment unit
13: Application processing unit
14: Display control unit
15: Pointer display control unit
30: Position detection unit
40: Display unit
41: Icon
42, 46: Pop-up
45: Thumbnail
50: Proximity touch panel
63: Index finger
65, 66, 67: Detection point
71: Text message

The invention claimed is:

1. A display device comprising:
a 3-D touch panel that detects coming into proximity or contact of a detection target and
position coordinates of the detection target whose coming into proximity or contact has been detected, the position coordinates including coordinates in X and Y directions that are parallel with a surface of the touch panel and a coordinate in a Z direction that is perpendicular to the surface of the touch panel;
a display on which the touch panel is provided;
a processor and a memory configured as
a direction judger that judges a direction of the detection target on the basis of the position coordinates detected by the 3-D touch panel; and
a display controller that controls the display such that a part of display contents of the display which would otherwise be hidden by the detection target is prevented from being hidden, on the basis of the direction of the detection target judged by the direction judger, wherein:
the direction judger judges a direction of the detection target when the coordinate in the Z direction of the detection target detected by the 3-D touch panel is in a first coordinate range; and
the display controller controls the display to perform a display so as to avoid a portion of a screen of the display which is hidden by the detection target, when the coordinate in the Z direction of the detection target detected by the 3-D touch panel is in a second coordinate range, which is smaller than the first coordinate range.

2. The display device according to claim 1, wherein the display controller estimates an overlap portion in the X and Y directions between the screen of the display and the detection target, and controls the display to perform a display so as to avoid the overlap portion.

3. The display device according to claim 1, wherein the display controller controls the display to display the part of the display contents at a position that is adjacent to and pointed by a tip of the detection target on the basis of the direction of the detection target judged by the direction judger.

4. The display device according to claim 1, wherein when sets of position coordinates of two points are detected by the 3-D touch panel, the direction judger judges the direction of the detection target on the basis of a direction of a vector that has, as an initial point, a first point having a large coordinate in the Z direction between the two points, and has, as an terminal point, a second point having a small coordinate in the Z direction.

5. The display device according to claim 1, wherein when sets of position coordinates of three points are detected by the 3-D touch panel, the direction judger judges the direction of the detection target on the basis of a positional relationship between a straight line, connecting a first point having a largest coordinate in the Z direction among the three points and a second point having a second largest coordinate in the Z direction, and a third point having a third largest coordinate in the Z direction.

6. The display device according to claim 4, wherein the display controller identifies a display item displayed on the screen using the second point, and controls a display position of information relating to the identified display item according to the position coordinates of the first point.

7. The display device according to claim 1, wherein when the coordinate in the Z direction is in the first coordinate range or the second coordinate range, the display controller controls the display to display information indicating that the coordinate in the Z direction is in the first coordinate range or the second coordinate range.

8. A display control method of a display device having a touch panel that detects coming into proximity or contact of a detection target, the display control method comprising:
detecting position coordinates of the detection target whose coming into proximity or contact has been detected by the touch panel, the position coordinates including coordinates in X and Y directions that are parallel with a surface of the touch panel and a coordinate in a Z direction that is perpendicular to the surface of the touch panel;
judging a direction of the detection target on the basis of the detected position coordinates;
controlling a display, on which the touch panel is provided, to perform a display such that a part of display contents of the display which would otherwise be hidden by the detection target is prevented from being hidden, on the basis of the direction of the direction-judged detection target;
judging a direction of the detection target when the coordinate in the Z direction of the detected detection target is in a first coordinate range; and
controlling the display to perform a display so as to avoid a portion of a screen of the display which is hidden by the detection target when the coordinate in the Z direction of the detected detection target is in a second coordinate range, which is smaller than the first coordinate range.

9. A non-transitory computer readable recording medium storing a display control program that causes a computer comprising a display device having a touch panel that detects coming into proximity or contact of a detection target, to-perform operations comprising:
detecting position coordinates of the detection target whose coming into proximity or contact has been detected by the touch panel, the position coordinates including coordinates in X and Y directions that are parallel with a surface of the touch panel and a coordinate in a z direction that is perpendicular to the surface of the touch panel;
judging a direction of the detection target on the basis of the detected position coordinates;
controlling a display, on which the touch panel is provided, to perform a display such that a part of display contents of the display which would otherwise be hidden by the detection target is prevented from being hidden, on the basis of the direction of the judged detection target,
judging a direction of the detection target when the coordinate in the Z direction of the detected detection target is in a first coordinate range; and
controlling the display to perform a display so as to avoid a portion of a screen of the display which is hidden by the detection target when the coordinate in the Z direction of the detected detection target is in a second coordinate range, which is smaller in the coordinate in the Z direction than the first coordinate range.

10. An input device comprising:
a 3-D touch panel that detects position coordinates of a detection target, while the detection target is approaching and not touching a surface of the touch panel, the position coordinates including coordinate in a Z direction that is perpendicular to the surface of the touch panel; a display, on which the touch panel is provided, and that displays an object; a processor and a memory configured as a pointer coordinates controller that judges, based on the detected position coordinates, whether the detection target is approaching for a touch manipulation of the object or for a contactless manipulation of the object, the touch manipulation manipulating the object by touching the 3-D touch panel with the detection target, the contactless manipulation manipulating the object without touching the 3-D touch panel with the detection target; and a display controller that controls the display to display an indicator indicating a position of a manipulation target when it is judged that the detection target is approaching for the contactless manipulation, and not to display the indicator when it is judged that the detection target is approaching for the touch manipulation.

11. The input device according to claim 10, wherein the pointer coordinates controller judges that the detection target is approaching for the contactless manipulation when the detected coordinate in the Z direction remains smaller than a prescribed threshold for a time period longer than a prescribed threshold time period.

12. The input device according to claim 10, wherein the detected position coordinates further includes coordinates of the detection target in X and Y directions that are parallel with the surface of the 3-D touch panel, the input device further comprising an application processor that detects the object displayed in a region on the display, the region corresponding to the detected coordinates in the X and Y directions, wherein the display controller controls the display not to display the indicator when a size of the detected object, displayed in the region on the display, is larger than a prescribed threshold, regardless of whether it is judged that the detection target is approaching for the contactless manipulation.

13. The input device according to claim 10, wherein the pointer coordinates controller judges that the detection target is approaching for the touch manipulation, when at least one of two conditions are met, the two condition including that the coordinate of the detection target in the Z direction is smaller than a prescribed distance and that a speed of the approaching of the detection target toward the surface of the 3-D touch panel in the Z direction is faster than a prescribed threshold speed.

14. The input device according to claim 10, wherein the pointer coordinates controller judges that the indicator being displayed on the display is to be erased when a transition from a state that the detection target is in contact with the surface of the touch panel to a state that the detection target is not in contact with the touch panel, is detected; and the display controller erases the indicator being displayed on the display on the basis of the judgment result of the pointer coordinates controller.

15. The input device according to claim 14, wherein after making the judgment that the indicator being displayed on the display is to be erased, the pointer coordinates controller continues to judge whether to display the indicator again according to the same judgment condition that was employed before the judgment that the indicator being displayed on the display is to be erased.

16. The input device according to claim 14, wherein after making the judgment that the indicator being displayed on the display is to be erased, the pointer coordinates controller judges whether to display the indicator again according to a judgment condition that is different from a judgement condition that was employed before the judgment that the indicator being displayed on the display is to be erased.

17. The input device according to claim 10, wherein the detected position coordinates further include coordinates of the detection target in X and Y directions that are parallel with the surface of the 3-D touch panel, and the display controller displays the indicator at a position that is spaced, by prescribed offsets, from the coordinates of the detection target in the X and Y directions.

18. The input device according to claim 17, wherein:

the pointer coordinates controller judges whether a prescribed picture has been displayed on the display; and the display controller changes the offsets according to a judgment result of the pointer coordinates controller.

19. The input device according to claim 17, wherein:

the pointer coordinates controller judges whether a speed of a movement of the detection target away from the 3-D touch panel in the Z direction is higher than a prescribed speed; and the display controller changes the offsets according to a judgment result of the pointer coordinates controller.

20. An input assistance method of an input device having a display on which a touch panel is provided and that displays an object, comprising:

detecting position coordinates of a detection target, while the detection target is approaching and not touching a surface of the touch panel, the position coordinates including a coordinate in a Z direction that is perpendicular to the surface of the touch panel;

judging, based on the detected position coordinates, whether the detection target is approaching for a touch manipulation of the object or for a contactless manipulation of the object, the touch manipulation manipulating the object by touching the touch panel with the detection target, the contactless manipulation manipulating the object without touching the touch panel with the detection target; and controlling the display to display an indicator indicating a position of a manipulation target when it is judged that the detection target is approaching for the contactless manipulation, and not to display the indicator when it is judged that the detection target is approaching for the touch manipulation.

21. A non-transitory computer readable recording medium storing a program that causes a computer comprising an input device having a display on which a touch panel is provided and that displays an object, to perform operations comprising:

detecting position coordinates of a detection target, while the detection target is approaching and not touching a surface of the touch panel, the position coordinates including a coordinate in a Z direction that is perpendicular to the surface of the touch panel;

judging, based on the detected position coordinates, whether the detection target is approaching for a touch manipulation of the object or for a contactless manipulation of the object, the touch manipulation manipulating the object by touching the touch panel with the detection target, the contactless manipulation manipulating the object without touching the touch panel with the detection target; and controlling the display to display an indicator indicating a position of a manipulation target when it is judged that the detection target is approaching for the contactless manipulation, and not to display the indicator when it is judged that the detection target is approaching for the touch manipulation.

\* \* \* \* \*